(12) United States Patent
Earnshaw et al.

(10) Patent No.: US 9,480,048 B2
(45) Date of Patent: Oct. 25, 2016

(54) HARQ SOFT BIT BUFFER PARTITIONING FOR CARRIER AGGREGATION

(75) Inventors: Andrew Mark Earnshaw, Ottawa (CA); Mo-Han Fong, Ottawa (CA); Michael Eoin Buckley, Rolling Meadows, IL (US); Youn Hyoung Heo, Waterloo (CA); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 618 days.

(21) Appl. No.: 13/823,778

(22) PCT Filed: Nov. 5, 2010

(86) PCT No.: PCT/US2010/055663
§ 371 (c)(1),
(2), (4) Date: Mar. 15, 2013

(87) PCT Pub. No.: WO2012/060842
PCT Pub. Date: May 10, 2012

(65) Prior Publication Data
US 2013/0176981 A1 Jul. 11, 2013

(51) Int. Cl.
*H04W 72/04* (2009.01)
*H04L 1/02* (2006.01)
*H04L 1/04* (2006.01)
*H04L 1/18* (2006.01)

(52) U.S. Cl.
CPC ............... *H04W 72/04* (2013.01); *H04L 1/02* (2013.01); *H04L 1/04* (2013.01); *H04L 1/1812* (2013.01); *H04L 1/1835* (2013.01); *H04L 1/1845* (2013.01)

(58) Field of Classification Search
None
See application file for complete search history.

(56) References Cited

U.S. PATENT DOCUMENTS

| | | | |
|---|---|---|---|
| 2006/0092973 | A1 | 5/2006 | Petrovic et al. |
| 2008/0276147 | A1 | 11/2008 | Gho et al. |
| 2009/0180034 | A1 | 7/2009 | Treigherman |
| 2009/0232050 | A1 | 9/2009 | Shen et al. |
| 2010/0095183 | A1 | 4/2010 | Petrovic et al. |
| 2010/0254328 | A1 | 10/2010 | Mcbeath et al. |

FOREIGN PATENT DOCUMENTS

| | | |
|---|---|---|
| CN | 101795183 | 8/2010 |
| EP | 1 389 847 | 2/2004 |
| WO | 2009118595 | 10/2009 |

OTHER PUBLICATIONS

Office Action dated Oct. 7, 2014, in Canadian Patent Application No. 2,816,400.
International Search Report Issued Feb. 2, 2011 in PCT/US10/55663 Filed Nov. 5, 2010.

(Continued)

*Primary Examiner* — Huy D Vu
*Assistant Examiner* — Teisha D Hall
(74) *Attorney, Agent, or Firm* — Jeffrey N. Giunta; Fleit Gibbons Gutman Bongini & Bianco P.L.

(57) ABSTRACT

A method, system and device are provided for partitioning a HARQ soft bit buffer between aggregated carriers as a function of carrier-related weighting factors so that the total number of soft buffer bits are efficiently allocated to obtain a plurality of soft buffer partitions for the plurality of aggregated carriers which are sized based on relative carrier-related weighting factors.

37 Claims, 7 Drawing Sheets

(56) References Cited

OTHER PUBLICATIONS

Office Action dated Feb. 27, 2014, in European Patent Application No. 10 784 902.8.

Office Action dated Jul. 28, 2014, in European Patent Application No. 10 784 902.8.

Chinese Office Action dated Dec. 16, 2014, received for Chinese Patent Application No. 201080069999.5.

Chinese Office Action dated Aug. 27, 2015, received for Chinese Application No. 201080069999.5.

HARQ SOFT BIT BUFFER PARTITIONING FOR CARRIER AGGREGATION

BACKGROUND OF THE INVENTION

1. Field of the Invention

The present invention is directed in general to communications systems and methods for operating same. In one aspect, the present invention relates to the methods, systems and devices for performing HARQ operations.

2. Description of the Related Art

Long Term Evolution (LTE) Advanced is a mobile communication standard currently under development for submission as a major enhancement of the 3GPP Long Term Evolution (LTE) standard to define an Evolved Universal Terrestrial Radio Access (E-UTRA) radio technology in which multiple simultaneous transport blocks can be used to send data from an E-UTRAN Node B (eNB) to a user equipment (UE) device. To address potential data transmission errors, a Hybrid Automatic Repeat Request (HARQ) scheme is defined in the existing LTE 3GPP standard which provides a combination of forward error-correcting coding and error detection coding using the HARQ error-control method to detect and correct data transmission errors. With existing HARQ schemes, incorrectly received coded data blocks may be stored in a soft buffer at the UE/receiver so that, when the retransmitted block is received, the received values for the two blocks may be combined. Unfortunately, conventional (Rel-8) approaches for dividing the soft buffer among downlink (DL) HARQ processes may result in inefficient HARQ operations and/or buffer utilization, particularly when data blocks are being transmitted over multiple aggregated carriers (Rel-10) which may not have identical channel and/or interference conditions and/or properties and/or when carrier-related transmission mode reconfiguration occurs.

As will be appreciated, there are challenges to using current HARQ schemes to partition the soft buffer among different HARQ processes, especially as the number and type of carriers increase with carrier aggregation techniques. Accordingly, a need exists for improved methods, systems and devices for managing downlink HARQ soft buffers to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
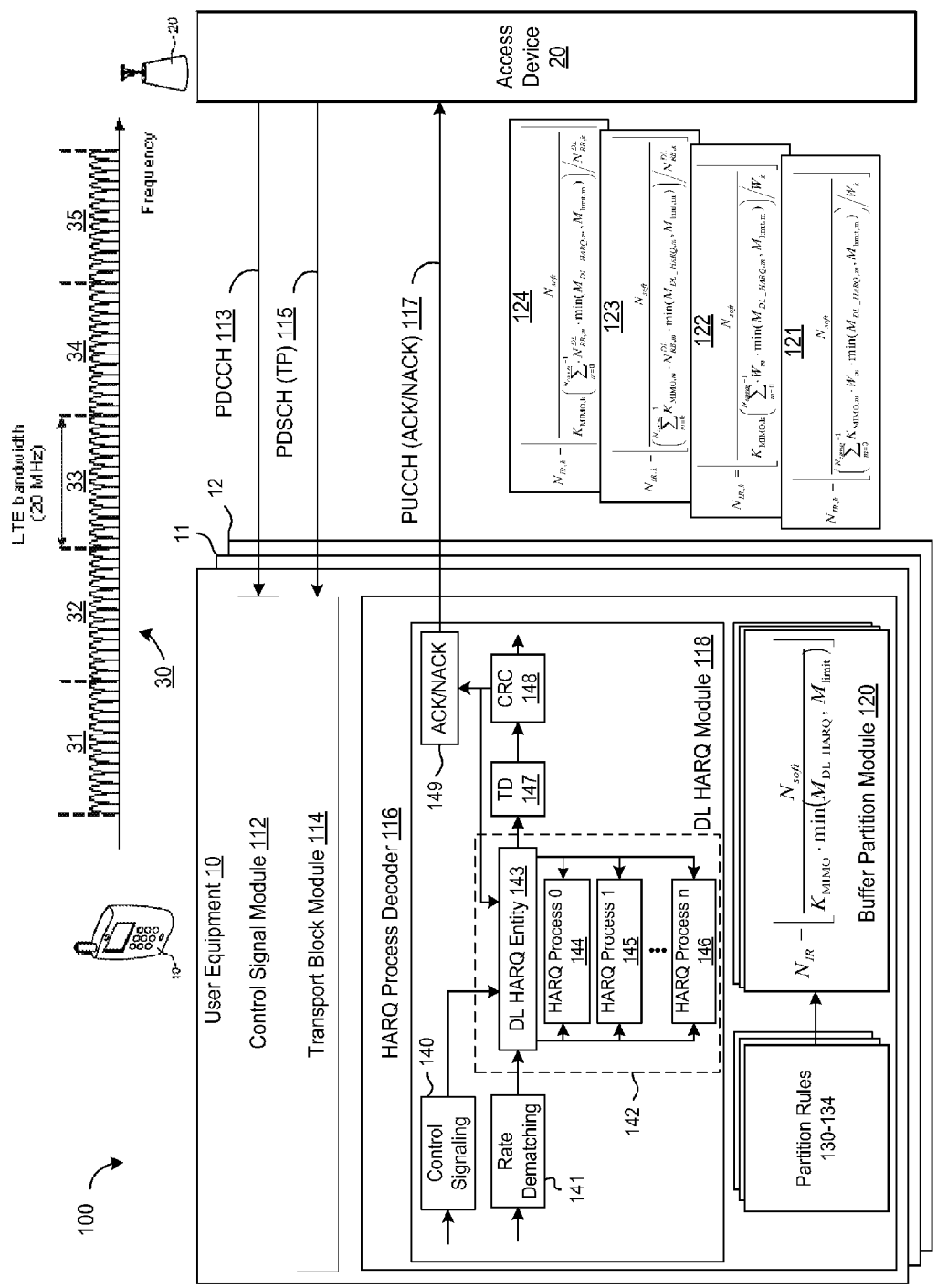
FIG. 1 is a schematic diagram showing components of a communication system including a user agent that includes HARQ soft buffer partitioning for carrier aggregation.

A method, system and device are provided for managing a HARQ soft buffer so that the total available soft buffer bits are partitioned among multiple aggregated carriers based on the specific bandwidths and/or performance and/or other characteristics for each carrier to account for differing channel conditions and/or interference levels and/or other properties of the carriers. Rather than blindly and equally divide the total available soft bits between the aggregated carriers, carrier-dependent weighting factors are used at the transmitter and/or receiver to partition the soft buffer into separate buffers for each aggregated carrier, where the weighting factors could be broadcast or signaled to the receiver with RRC signaling, conveyed in the system information, or otherwise conveyed or implicitly derived by the receiver from other system information parameters. In other embodiments, the relative bandwidths of the aggregated carriers are used to partition the soft buffer based on the expectation that transport blocks received on a wider bandwidth carrier may have a larger size (or larger maximum size) than transport blocks received on a narrower bandwidth carrier. For these embodiments, allocation rules or equations are provided for determining the soft bit buffer size for transport blocks on a particular carrier using weighting factors for the carriers, such as the relative weighting of each carrier's bandwidth as compared to the total combined bandwidth of all carriers. In addition, buffer repartitioning rules are provided to minimize the impact of carrier-related reconfiguration on HARQ performance by limiting any potential buffer flush operations to apply only to the soft buffer(s) of the reconfigured carrier(s). In selected embodiments, the HARQ soft buffer management mechanism enables downlink HARQ processes in Release 10 of E-UTRA (also known as Long Term Evolution Advanced (LTE-A)) so that the total number of soft bits can be partitioned between multiple HARQ processes across multiple carriers. However, selected embodiments of the present invention may also be applied in some cases with uplink HARQ processes, such as future E-UTRA releases which may use Multiple Input Multiple Output (MIMO) for uplink transmissions. Furthermore, the examples described herein are only meant to be illustrative of the varied methods and systems, and could be applied to radio networks having different transmission modes and to scenarios where HARQ processes are used to receive and decode one or more transport blocks transmitted across multiple carriers.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms user agent (UA) and user equipment (UE) are used interchangeably to refer to wireless devices such as mobile telephones, personal digital assistants, handheld or laptop computers, desktop computers, set-top boxes, network nodes, and similar devices that have wireless telecommunications capabilities. In wireless telecommunications systems, transmission equipment in a base station or access point transmits signals throughout a geographical region known as a cell. As technology has evolved, more advanced equipment has been introduced that can provide services that were not possible previously, including but not limited to enhanced node B (eNB) devices rather than a base station or other systems and devices that are more highly evolved than the equivalent equipment in a traditional wireless telecommunications system. Such advanced or next generation equipment may be referred to herein as LTE equipment or LTE-Advanced (LTE-A) equipment, and a packet-based network that uses such equipment can be referred to as an evolved packet system (EPS). As used herein, the terms access device or access point refer interchangeably to any component that can provide a UE with access to other components in a telecommunications system, including but not limited to a traditional base station or an LTE or LTE-A access device. An access point provides radio access to one or more UEs using a packet scheduler to dynamically schedule downlink traffic data packet transmissions and allocate uplink traffic data packet transmission resources among all the UEs communicating to the access device. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

The access device uses different downlink control information (DCI) message formats to communicate data packet resource assignments to UEs including both downlink and uplink resource assignments. Typically, an access device selects one of the DCI formats for allocating resources to a UE as a function of several factors including UE and access device capabilities, the amount of data to transmit to a UE, the amount of communication traffic within a cell, channel conditions, etc. UEs refer to the scheduling/resource allocation information for the timing and the data rate of uplink and downlink transmissions and transmit or receive data packets accordingly. DCI formatted control data packets are transmitted via the Physical Downlink Control CHannel (PDCCH).

Hybrid Automatic Repeat reQuest (HARQ) is a scheme for re-transmitting a traffic packet to compensate for an incorrectly received traffic packet, and can be used in LTE systems for both uplink and downlink data transmission. For downlink transmissions where a UE receives a downlink packet, a positive acknowledgment (ACK) may be transmitted on a Physical Uplink Control Channel (PUCCH) from the UE (or multiplexed with a PUSCH transmission) to the access device after a cyclic redundancy check (CRC) performed by the UE indicates a successful decoding. If the CRC indicates a packet is not received correctly, a UE HARQ entity transmits a negative acknowledgement (NACK) on the PUCCH (or multiplexed on the PUSCH) in order to request a retransmission of the erroneously received packet. Once a HARQ NACK is transmitted to an access device, the UE waits to receive a retransmitted packet. When a retransmission request is received at an access device, the access device retransmits the incorrectly received packet to the UE. This process of transmitting, ACK/NACK and retransmitting continues until either the packet is correctly received or a maximum number of retransmissions have occurred. As used herein, a HARQ process refers to the transmission of a NACK, waiting for a retransmitted packet and attempting to decode the retransmitted packet.

To support higher data transfer rates (e.g., for transmitting audio-video data to a UE over a short amount of time), an access device may commence several data packet transmission processes in parallel. To facilitate a HARQ scheme for each of a plurality of simultaneous packet transmissions, access devices and UEs may be programmed to support parallel HARQ processes. To this end, each DCI formatted downlink resource grant on the PDCCH includes a three bit HARQ process number or HARQ process indicator (HPI) corresponding to an associated data packet. When a data packet is not correctly received, the incorrectly received packet and associated HPI are stored by the HARQ entity in a HARQ decoding buffer (a.k.a., soft buffer), and a NACK is transmitted back to the access device to request retransmission of the data packet. The access device retransmits the data packet along with the HPI associated with the original transmitted data packet to the UE. When the retransmitted packet and HPI are received, the UE delivers the retransmitted packet to the HARQ process associated with the received HPI. The HARQ process attempts to decode the combined packet data from multiple transmissions and the HARQ process continues. Where the HPI is three bits, the maximum number of simultaneous HARQ processes is eight.

Another approach for increasing data transfer rates is to increase the transmission bandwidth, such as by using multiple carriers (i.e., multiple frequencies) to communicate between an access device and UEs. In 3GPP, it has been agreed that carrier aggregation will be used for LTE-Advanced (E-UTRA Rel-10) in order to support wider transmission bandwidths and hence increase the potential peak data rate to meet LTE-A requirements. In downlink carrier aggregation, multiple downlink component carriers may be aggregated and sent within the same subframe. In FIG. 1, there is depicted an example of carrier aggregation 31-35 where each component carrier (e.g., 33) has a width of 20 MHz, and the total downlink system bandwidth is thus 100 MHz. However, it is understood that a different number than the five downlink component carriers shown in FIG. 1 may be allocated to a particular UE, and that the bandwidths of different component carriers need not necessarily be the same. The UE may receive on a plurality of up to a specified maximum number of downlink component carriers depending on the UE's capabilities and eNB deployment scenario. In addition, depending on the deployment scenario, carrier aggregation may occur with carriers located in the same frequency band and/or carriers located in non-adjacent (non-contiguous) frequency bands. For example, one carrier may be located at 2 GHz and a second non-adjacent aggregated carrier may be located at 800 MHz.

Where transmission rate is increased via use of carrier aggregation, the number of separate HARQ processes required to manage data transmitted on multiple carriers should be increased. In addition, the size of the HARQ decoding/soft buffer should also be increased to allow for storage of additional data associated with the additional carriers and associated HARQ processes. The different transmission capabilities and associated minimum buffer size requirements are summarized in Table 1 below as a function of the different UE categories for Rel-10 which will be defined in 3GPP TS Section 36.306, §4.1 and the publication entitled "LS on Rel-10 UE Category," 3GPP TSG RAN WG1 Meeting #62, R1-105095.

although these categories can also be used for Rel-10 UEs with the full UE capability (e.g., carrier aggregation abilities) being communicated via separate signaling. For example, a Category 3 Rel-10 UE could support carrier aggregation of 2 carriers each with a 10 MHz bandwidth, and the carrier aggregation related information would be communicated via additional UE capability signaling. Since the number of supported layers for spatial multiplexing in the downlink will be signaled separately, this parameter is not included in the UE Categories table.

To understand how the HARQ downlink buffers are partitioned and used for carrier aggregation signaling in Rel-10 UE devices, reference is now made to FIG. 1 which schematically depicts a multi-channel communication system 100 including an access device 20 and one or more user equipment (UE) devices 10-12, each of which is configured to partition the HARQ downlink/soft buffer for carrier aggregation. The UE 10 includes, among other components, one or more processors that run one or more software programs to communicate with access device 20 to receive data from, and to provide data to, access device 20. When data is transmitted from UE 10 to access device 20, the data is referred to as uplink data and when data is transmitted from access device 20 to UE 10, the data is referred to as downlink data. To facilitate communications, a plurality of different communication channels are established between access device 20 and UE 10, including but not limited to a Physical Downlink Control CHannel (PDCCH) 113, a Physical Downlink Shared CHannel (PDSCH) 115, and a Physical Uplink Control CHannel (PUCCH) 117. The PDCCH 113 is a control channel received by the UE's control signaling module 112 that allows access device 20 to control UE 10 during downlink data communications by transmitting scheduling or control data packets (a.k.a., downlink control information (DCI) packets) to the UE 10 to indicate scheduling to be used by UE 10 to receive downlink communication traffic packets (i.e., non-control data to be used by applications run by UE 10). A separate DCI packet is transmitted by access device 20 to UE 10 for each traffic packet (TP) transmitted. In addition to including information indicating scheduling for an associated traffic packet, a DCI packet may include a HARQ process indicator (HPI) that can be used to facilitate a HARQ process, if necessary, for the traffic packet. In both the original PDCCH

TABLE 1

Downlink physical layer parameter values set by UE category

| UE Category | Maximum number of DL-SCH transport block bits received within a TTI | Maximum number of bits of a DL-SCH transport block received within a TTI | Total number of soft channel bits (DL HARQ) | Maximum number of supported layers for spatial multiplexing in DL |
|---|---|---|---|---|
| 1 | 10296 | 10296 | 250368 | 1 |
| 2 | 51024 | 51024 | 1237248 | 2 |
| 3 | 102048 | 75376 | 1237248 | 2 |
| 4 | 150752 | 75376 | 1827072 | 2 |
| 5 | 299552 | 149776 | 3667200 | 4 |
| 6 | [299552] | [TBD] | [3667200] | — |
| 7 | [299552] | [TBD] | [TBD] | — |
| 8 | [1200000] | [TBD] | [TBD] | — |

In Table 1, the total number of soft channel bits for DL HARQ is listed by UE Category (with square brackets indicating values that have been proposed, but have not yet been fully ratified). UE Categories 6-8 have been newly introduced to take full advantage of Rel-10 features, and UE Categories 1-5 were originally defined for Rel-8 UEs, transmission and in any PDCCH retransmission, the DCI and HPI values for an associated packet are transmitted. After transmitting the control signal on the PDCCH channel 113, the access device 20 transmits associated traffic data packets on PDSCH 115 which are received by the UE's transport block module 114. When required, the traffic packet will be re-transmitted on PDSCH 115. As part of the HARQ downlink process, the UE 10 transmits acknowledgement (ACK) and negative acknowledgement (NACK) signals to access device 20 via the uplink PUCCH 117 (though in some cases a Physical Uplink Shared CHannel (PUSCH) may be used for the uplink ACK/NACK functionality) for each of the traffic packets received to indicate either correct or incorrect packet reception, respectively. Where a traffic packet is not received correctly and a NACK is transmitted back to access device 20, access device 20 typically transmits another DCI packet and retransmits the incorrectly received traffic packet to UE 10.

For HARQ, each received coded bit is assigned a soft value. The soft values may be represented with a fixed point number within an actual implementation. For example, a soft value using 5 bits of precision may be between negative fifteen and positive fifteen to define a bit that has been received. In this case, the sign may be used to indicate what the receiver hypothesizes that the bit is, where (for example) a negative sign may represent a bit value of zero and a positive sign may represent a bit value of one, and the magnitude is the level of confidence that the receiver has with regard to the value. Thus, a plus fifteen may show that the receiver is fairly sure that a bit value of "one" was received, whereas a negative fifteen may indicate that the receiver is fairly sure that a bit value of "zero" was received. Conversely, a fixed point number of "+1" may indicate that the receiver thinks that a bit value of 1 was received, but is not very sure. These soft bit values are then used as the input to the turbo decoder which performs Forward Error Correction (FEC) decoding, although any just-received soft bit values may first be combined with other previously stored/buffered soft bit values prior to FEC decoding. One commonly used approach for computing such soft values is referred to as the log likelihood ratio (LLR) approach in which the soft value represents the log of the probability of the coded bit being a 1 divided by the probability of the coded bit being a 0.

To this end, each UE 10 maintains a HARQ process decoder 116 using hardware and/or software executed by one or more processor elements. The HARQ process decoder 116 includes a downlink HARQ module 118 and a buffer partition module 120-124 which are illustrated in FIG. 1 with a functional block diagram. In particular, after rate dematching 141, the encoded soft bit values for one or two received transport blocks (depending upon the MIMO mode) are delivered to the DL HARQ entity 143 which coordinates the DL HARQ activity. At the same time, the DL HARQ entity 143 receives additional control signaling information from control signaling block 140, such as the transport block size(s), the number of encoded bit values, the DL HARQ process to associate with the transport block(s), and whether the received data represents a new transmission or a retransmission. The indicated DL HARQ entity 143 then combines the newly received data with any previously received and accumulated Log Likelihood Ratio (LLR) information from the HARQ downlink/soft buffer 144-146, and provides the new resulting set of LLRs to the turbo decoder (TD) 147. A CRC check module 148 performs a 24-bit CRC check on the decoded transport block to indicate whether the transport block was successfully received or not. The transport block itself may consist of multiple concatenated code blocks formed from segmentation of the transport block, with each code block being appended with its own equally-powerful (24-bit) individual CRC. The result of the transport block CRC check 148 is provided to the ACK/NACK signal module 149 to generate DL HARQ ACK/NACK feedback on the uplink PUCCH channel 117 to the access device 20, and is also fed back to the DL HARQ entity 143 so that the associated DL HARQ process knows whether or not the decoding was successful.

In the event of an unsuccessful decoding, the DL HARQ entity 143 stores the incorrectly received data packets along with information that uniquely identifies one of a plurality of HARQ processes associated with the incorrectly received packet(s). To this end, exemplary soft bit buffers 144-146 are provided for storing the incorrectly received data and associated HARQ process identifiers for possible combining with future DL HARQ retransmissions. In the situation where the UE 10 is not able to decode a transport block on the first transmission attempt, the DL HARQ entity 143 stores the soft bit values (these are the LLR values that are input to the turbo decoder and which can commonly be represented as fixed point signed numeric values with several or more bits of precision) in a soft bit buffer (e.g., 144) corresponding to the current DL HARQ process. When a HARQ retransmission of the same transport block occurs to the same DL HARQ process, the UE can combine the newly-received soft bit values with the previously-stored soft bit values of the same transport block, and then use these combined soft bit values as input for turbo decoding. As another example, where an original traffic packet is incorrectly received, that packet would be stored with an associated HARQ process identifier (e.g., HARQ Process 0) in a first soft buffer 144, a second incorrectly received traffic packet (i.e., a packet retransmitted a first time) associated with HARQ Process 0 would be combined with the original packet and then stored in first soft buffer 144, and so on. In the event of a successful transport block decoding, the decoded information is passed upwards to higher protocol layers and the soft bit values do not necessarily need to be retained for future use.

As indicated above, each of the available downlink HARQ processes maintains a soft bit buffer (e.g., 144) for soft combining purposes. The size of the soft bit buffer is defined in terms of the number of soft channel bits, where each soft bit represents a numerical value such as a LLR used for Forward Error Correction (FEC) decoding purposes. In addition, each soft bit value requires one or more bits of physical memory storage, depending on the range of numerical values being used. In LTE, a total number of soft channel bits for all downlink HARQ processes is defined in terms of the UE category. This is shown above in Table 1 where each UE category has a maximum number of downlink shared channel (DL-SCH) transport block bits received within a TTI (Transmission Time Interval). As used herein when referring to DL-SCH transport blocks carried on the PDSCH and/or to UL-SCH (Uplink Shared CHannel) transport blocks carried on the PUSCH, one TTI can be considered to be equivalent to one subframe, and may also be referred to as one transmission opportunity. In the context of E-UTRA, therefore, one transmission opportunity refers to a transmission unit of time equal to one subframe, which may have a length of 1 ms. The fourth column of Table 1 indicates the total soft buffer size across all HARQ processes, where the total number of soft channel bits is the total for all of the HARQ processes.

One of the challenges for designing the HARQ decoder is to allocate the total soft buffer size among the HARQ processes. To this end, the UE 10 includes one or more buffer partition modules 120-124 which allocate the total HARQ DL soft buffer size among the transport blocks being processed by the DL HARQ entity 143. In particular, the buffer partition module(s) 120-124 may be implemented with hardware and/or software executed by one or more processor elements which are used to calculate the soft buffer size for the transport blocks, depending on the UE category being used by the UE 10.

For example, when the UE 10 is implemented to operate in one of the Release 8 UE categories (e.g., UE Categories 1-5), the HARQ downlink soft buffer is partitioned using buffer partition module 120 which implements the following equation (taken from Section 5.1.4.1.2 of 3GPP TS 36.212, version 8.7.0, 2009-06, the contents of which are incorporated herein by reference) to compute the soft buffer size for a transport block as:

$$N_{LR} = \left\lfloor \frac{N_{soft}}{K_{MIMO} \cdot \min(M_{DL\_HARQ}, M_{limit})} \right\rfloor \quad \text{Equation 1}$$

In Equation 1, $N_{IR}$ is the number of incremental redundancy bits (i.e. the soft buffer size for one individual transport block). $N_{soft}$ is the total number of soft channel bits as provided in Table 1 above. $K_{MIMO}$ is equal to 2 if the UE is configured to receive physical downlink shared channel (PDSCH) transmissions based on transmission modes 3 or 4, but is equal to 1 otherwise. $M_{DL\_HARQ}$ is the maximum number of downlink HARQ processes which is fixed as 8 for frequency division duplexing but may be variable for time division duplexing. $M_{limit}$ is a constant and is equal to 8. With Equation 1, the available soft bit buffer memory is divided equally among all of the transport blocks that may be buffered (8 transport blocks in total for non-spatial multiplexing, and 16 transport blocks (two per HARQ process) for spatial multiplexing). In other words, the buffer memory is divided equally among the downlink HARQ processes. This is true even if various transport blocks are of different sizes. Thus, when a transmission mode potentially utilizes two transport blocks per subframe such as in transmission modes 3 or 4, the amount of soft bit buffer memory per transport block is half of what it would be for the other transmission modes. That is, the total buffer memory allocated per downlink HARQ process is either occupied by one transport block for transmission modes 1, 2, 5, 6 or 7, or divided equally between two transport blocks for transmission modes 3 and 4, regardless of the actual sizes of the individual transport blocks that may be stored in these buffers. As will be appreciated by those skilled in the art, there may be various numbers of these HARQ processes such as 8 HARQ processes in FDD. In this case, buffers for each of these 8 DL HARQ processes would be provided although a single total area of buffer memory would generally be used in an actual implementation and divided into 8 or 16 buffer memory portions.

In certain cases, depending upon the size(s) of the transport block(s) being handled, some of the parity bits from the turbo coding may not be included on a per code block basis. Consider a transport block of size $N_{tb}$ bits. Given that the maximum code block size is 6144 bits, a transport block would contain the following number of code blocks.

$$C = \left\lceil \frac{N_{tb} + 24}{6144 - 24} \right\rceil \quad \text{Equation 2}$$

where it is assumed that there are at least two code blocks within the transport block with code block CRCs included in addition to the separate transport block CRC, and that a code block CRC is not included when a transport block contains only one code block. Since all CRCs have a size of 24 bits, the +24 in the numerator of the fraction accounts for the addition of the transport block CRC, and the −24 in the denominator of the fraction accounts for the 24 code block CRC bits that need to be added to each code block. When a transport block must be segmented into multiple code blocks, each code block can contain a maximum of 6120 information bits and 24 code block CRC bits for a combined maximum code block size of 6144 bits.

The soft buffer size for a particular code block within a specific transport block is obtained as:

$$N_{cb} = \min\left(\left\lfloor \frac{N_{IR}}{C} \right\rfloor, K_w\right) \quad \text{Equation 3}$$

where C is the number of code blocks for the transport block in question as calculated in Equation 2, $N_{IR}$ is the soft buffer size for a transport block described in Equation 1, and $K_w$ is equal to the total length of the turbo coder output (systematic and parity bits) for that code block prior to rate matching.

Figure 2:
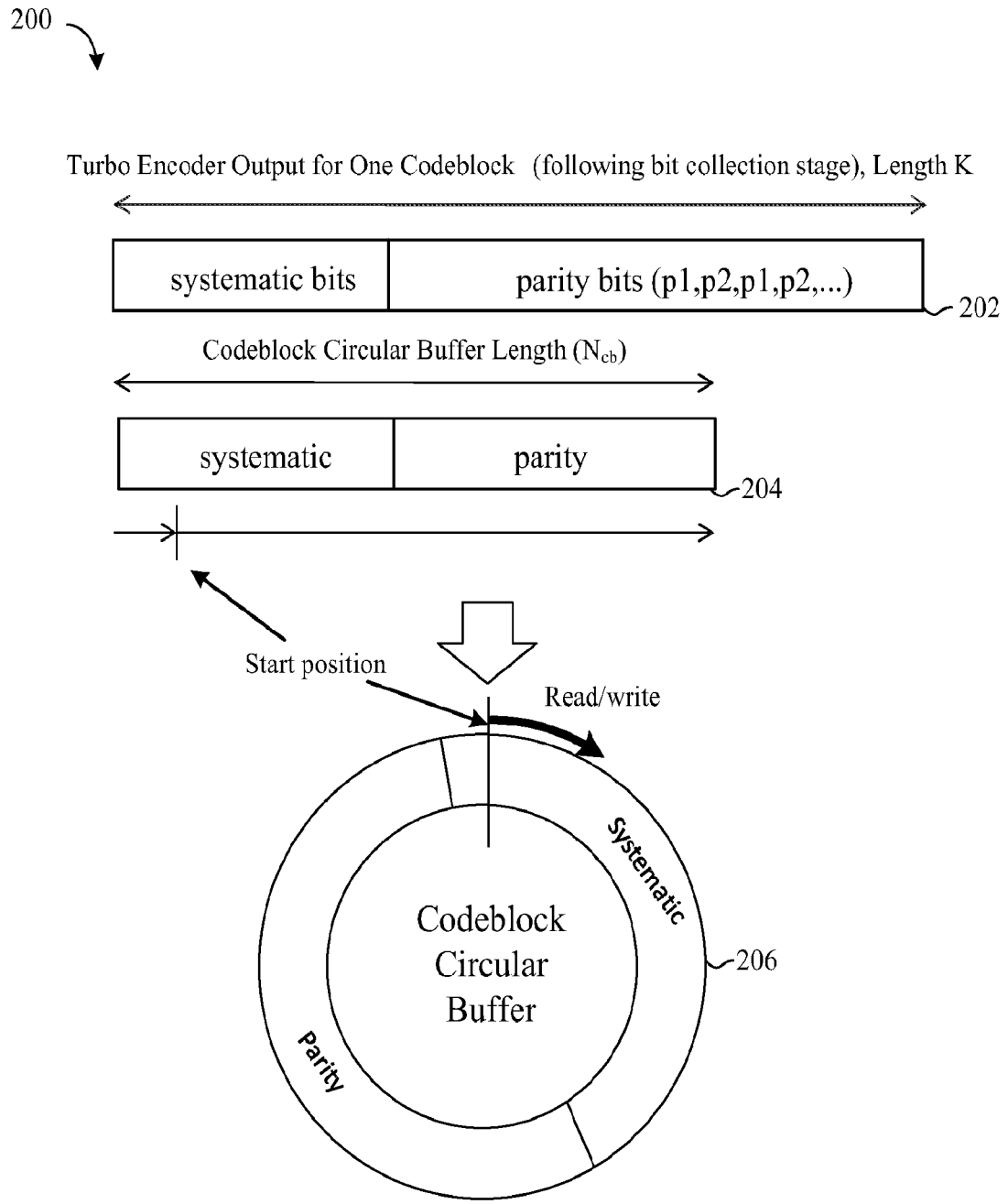
FIG. 2 depicts a circular buffer rate matching scheme which may be used to implement a HARQ downlink soft buffer.

With LTE Rel-8 and Rel-10 UEs, the HARQ downlink/soft buffers 144-146 may be implemented with a circular buffer 206 of length $K_w$. An example circular buffer rate matching scheme is depicted in FIG. 2 which shows how a circular buffer 206 having code block circular buffer length $N_{cb}$ is used to read and write the systematic and parity bits of code blocks 202, 204. As illustrated, the starting position in the circular buffer 206 of the coded bits to be transmitted varies depending upon the current incremental redundancy version. A specific set of bits is selected for transmission simply by identifying the appropriate starting position within the buffer, and then reading the desired number of stored bits out of the buffer in order and wrapping around to the beginning of the buffer if the end of the buffer is reached. With the circular buffer rate matching scheme 200 depicted in FIG. 2, it can be seen that, for a code block of length K (which includes the 24-bit code block CRC), the value of $K_w$ can be calculated as $K_w = 3K_\Pi$, where $K_\Pi = R_{subblock}^{TC} \times C_{subblock}^{TC}$, with $$R_{subblock}^{TC} = \left\lceil \frac{K+4}{C_{subblock}^{TC}} \right\rceil$$

and $$C_{subblock}^{TC} = 32.$$

Figure 3:
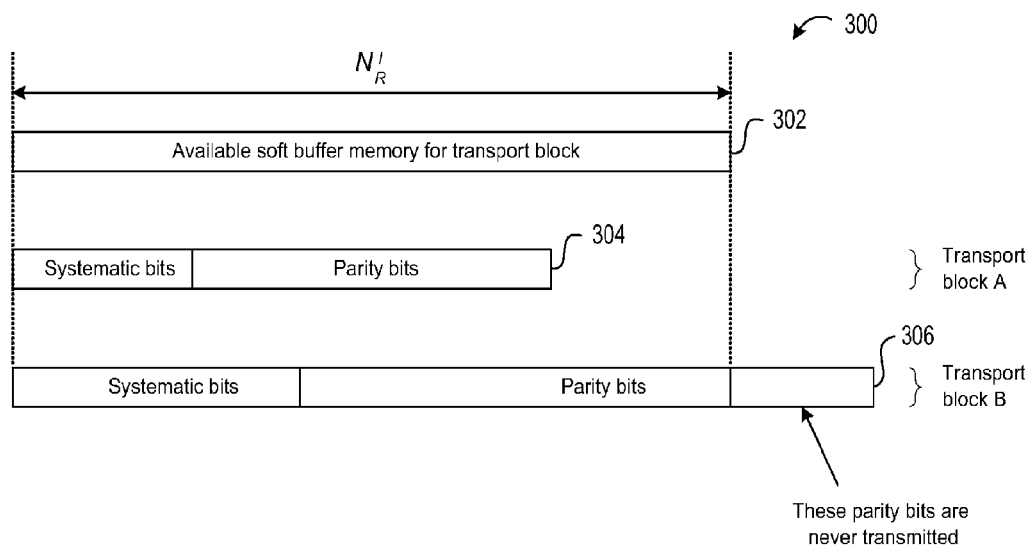
FIG. 3 illustrates how transport blocks may have truncated parity bits, depending on the length of the transport block and the size of the available soft buffer.

When Equation 3 is used to calculate the soft buffer size for a particular code block as $N_{cb} = K_w$, this implies that the full set of systematic and parity bits from the base 1/3 rate turbo coder can be stored in the DL HARQ downlink/soft buffer when one transport block per DL HARQ process is configured. This is illustrated in FIG. 3 with reference to transport block A 304 which is transmitted without parity bit truncation since it fits within the available soft buffer transport block memory 302. However, when the soft buffer size $N_{cb}$ is calculated (per Equation 3) as $N_{cb} = \lfloor N_{IR}/C \rfloor$, this indicates that the size of the corresponding transport block 306 is larger than a certain threshold so that it is not possible to store all of the $K_w$ systematic and parity bits from the base 1/3 rate turbo coder for each of the code blocks making up this size of transport block. The truncation of parity bits is shown in FIG. 3 with reference to transport block B 306. As will be appreciated, this constraint is part of the defined rate matching algorithm, so a certain subset of the parity bits would never be transmitted regardless of the number of DL HARQ retransmissions and the redundancy versions that were sent. As a result, the HARQ DL soft buffer would not have soft values for all of the input parity bits to the turbo decoder since the buffer would not be sized sufficiently large to hold all of the parity bits. In this case, it would be necessary to insert "no information" bits (where a "no information" soft value might correspond to a LLR value of zero or equivalently indicate equal probability of a 0 or 1, however this is up to actual implementation design) separately as the LLR values for a given code block passed from the HARQ DL soft buffer to the turbo decoder.

Figure 4:
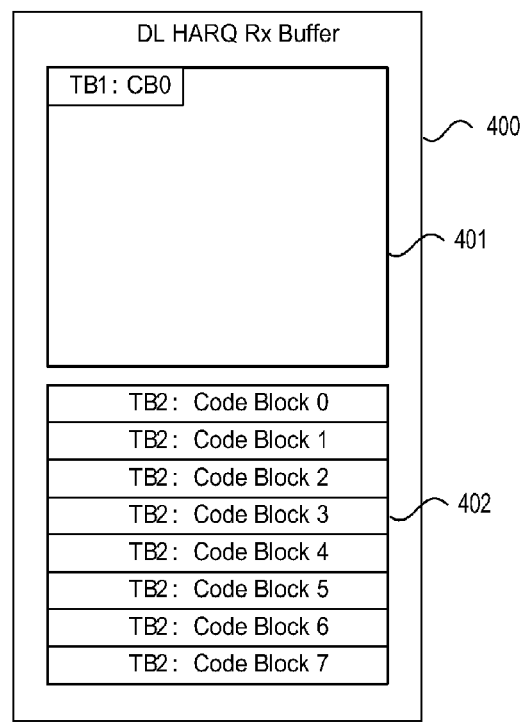
FIG. 4 illustrates an inefficient partitioning of a soft buffer with two transport blocks of different sizes.

To illustrate how the HARQ DL soft buffer is used, an example is now described of a Category 3 UE that must support a total number of $N_{soft}=1237248$ soft channel bits (as per Table 1). For the case of no spatial multiplexing ($K_{MIMO}=1$), the soft buffer size for a transport block $N_{IR}=154656$, and for the case of spatial multiplexing ($K_{MIMO}=2$), the soft buffer size for a transport block $N_{IR}=77328$. To illustrate how different transport blocks are handled in the HARQ DL soft buffer, consider the case in which there are two transport blocks, with TB1 of size 1672 bits and TB2 of size 43816 bits. TB1 will have one code block of size 1696 bits (including the 24-bit CRC) which would correspond to 3×1696=5088 soft bits. TB2 will have eight code blocks, with each code block having the same length of 5504 bits (including a 24-bit CRC per code block). This would correspond to an ideal maximum of 3×5504=16512 soft bits per code block. However, a total of only 77328 soft bits are allocated for each transport block in this instance. The number of soft bits that would be stored per code block equals 77328/8=9666 in this example. Thus, for each code block of TB2, only the systematic bits and approximately 38% of the parity bits would actually be transmitted and combined in the DL HARQ Rx buffer. FIG. 4 shows the resulting inefficient memory utilization with this example of a partitioning a soft buffer memory 400 equally between two transport blocks of different sizes, where the first transport block TB1 uses only a small fraction of the allocated buffer memory portion 401 available to it, while the second transport block TB2 completely fills its allocated buffer memory portion 402. As this extreme example illustrates, the existing schemes for allocating the buffer memory may not efficiently utilize the buffer memory, especially when transport blocks on different carriers are of significantly different sizes, thereby reducing HARQ performance.

As seen from the foregoing, it will be appreciated that the existing Release 8 approach given in Equation 1 for partitioning the total soft bits among the HARQ processes is not feasible for use with Release 10 UEs which use carrier aggregation. First of all, the Release 8 approach has a maximum of 8 HARQ processes which is sufficient for a single carrier scenario (e.g. Rel-8, where there are 8 DL HARQ processes for FDD), but would generally be expected to provide an insufficient number of soft bit combining buffers when multiple carriers are aggregated (assuming here that carrier aggregation is used to increase the available data rate to a UE and hence 8 HARQ processes are required on each carrier). For example, if N FDD carriers are aggregated and each carrier has 8 DL HARQ processes, then there will be a total of 8×N DL HARQ processes. If soft bit combining buffers for only 8 HARQ processes are available, then this is clearly insufficient for the UE's needs when N>1. Another problem with using Equation 1 partitioning arises because, for the Release 10 UE categories (categories 6 through 8 in Table 1), not all of the available soft bit memory may be used if soft bit combining buffers are partitioned for a maximum of 8 HARQ processes. For example, assume that a UE's category is such that a very large number of soft bits are available. However, the maximum number of bits in a particular DL-SCH transport block for that UE category may be sufficiently small such that even if 16 maximum-sized transport blocks (i.e. soft bits are partitioned for 8 HARQ processes, with each HARQ process holding 2 transport blocks (MIMO operation)) are stored, the full capacity of the soft bit memory will still not be made use of. This represents inefficient use of UE resources.

As described in the proposal entitled "Soft buffer size allocation for Rel-10 UE", 3GPP TSG RAN WG1 Meeting #62bis, R1-105187, there are proposals for allocating the HARQ DL soft buffer when used with Release 10 UEs which perform carrier aggregation. In these proposals, the number of HARQ processes stored in the soft combining buffer is linearly increased with the number of aggregated carriers. That is, the total number of soft bits should be partitioned based on a linear function of the number of aggregated carriers (e.g. 8×N for FDD, where N is the number of aggregated carriers). In addition, there are two solutions proposed for soft bit buffer partitioning. In the first solution, the soft bits are equally divided by the number of aggregated carriers, and the soft bit buffer sizes for individual transport blocks are separately derived for each carrier. In the second solution, the soft bits are partitioned such that the soft buffer sizes for all the transport blocks across all carriers are the same, regardless of the configured transmission mode for each individual carrier. With the second solution, soft bit buffer repartitioning is required for all carriers whenever the transmission mode of a particular carrier is reconfigured from a mode that has 1 transport block per HARQ process to a mode that has 2 transport blocks per HARQ process or vice versa.

When multiple carriers are aggregated, it is quite possible that different carriers will have different bandwidths. In E-UTRA Rel-8, allowable carrier bandwidths are currently {6, 15, 25, 50, 75, 100} resource blocks or {1.4, 3, 5, 10, 15, 20} MHz, respectively. If the aggregated carriers are of different bandwidths (for example a 10 MHz carrier and a 5 MHz carrier are aggregated together), it could be expected that the sizes of transport blocks transmitted on a wider bandwidth carrier may be larger than the sizes of transport blocks transmitted on a narrower bandwidth carrier. In reality, this expectation may or may not be valid depending on the scheduler design in the access device 20 (e.g., base station or eNB). The scheduler has flexibility to assign radio resources in both the time and frequency domains. The total volume of resource assigned is equal to the sum of the bandwidth-time products of each allocation. If the scheduler adopts a policy of sharing resources between users primarily in the time domain, then it may be expected that the bandwidth of each allocation (related to the transport block size) would vary in some accordance with the system bandwidth. On the other hand, if the scheduler adopts a policy of sharing resources in the frequency domain, the relationship between allocated bandwidth and system bandwidth may be reduced. More generally, the use of wider system bandwidths may be employed for one of two reasons: 1) to increase user data rates (or peak user data rates), or 2) to increase the number of users supported per cell (without necessarily increasing the data rate to each user). If the former, it may be expected that the transport block size varies as some function of system bandwidth. In such a situation, it would be desirable for the soft bit buffers for transport blocks on the wider bandwidth carrier to also be larger than the soft bit buffers for transport blocks on the narrower bandwidth carrier.

Soft Bit Buffer Partitioning Based on Carrier-Dependent Weighting

To overcome the noted deficiencies with using Release 8 partitioning and the other limitations noted with the proposals for allocating soft buffer sizes for Release 10 UEs, an improved soft buffer partitioning and allocation scheme is disclosed that can work with Release 10 UEs using carrier aggregation signaling. As disclosed, the total number of soft buffer bits for use with tracking HARQ processes on a plurality (i.e. more than one) of aggregated carriers are partitioned by assigning a known number of the soft buffer bits to each HARQ process of each carrier for soft bit buffering purposes. To this end, the UE 10 is provided with one or more additional buffer partition modules 121-122 which allocate the total HARQ DL soft buffer size based on carrier dependent weighting factors for use with carrier aggregation in a Release 10 UE. Generally speaking, the soft bit buffer may be partitioned using carrier-dependent relative weighting factors to determine the soft buffer sizes for each aggregated carrier, where the carrier-dependent weighting factors could be signaled to the UE using UE-specific Radio Resource Control (RRC) signaling or explicit weighting factors contained in the system information, or could be implicitly derived by the UE from other system information parameters. In selected example embodiments, the soft bit buffer is partitioned based on relative carrier bandwidths which are used as the carrier-dependent relative weighting factors, based on the expectation that transport blocks received on a wider bandwidth carrier would have a larger size (or larger maximum size) than transport blocks received on a narrower bandwidth carrier. In either case, it will be appreciated that the UE 10 and access point 20 both use the same method for partitioning the soft bit buffers in order to ensure that the encoded bits are handled properly at both the transmitter and receiver.

By using carrier-dependent weighting factors in partitioning the soft buffer, the HARQ process can account for channel conditions and/or interference conditions present for a particular carrier that can affect HARQ performance. For example, if a particular carrier is expected (in a long-term sense) to typically have poorer channel conditions and/or experience more interference than other carriers, then one strategy may be to allocate larger soft buffer sizes for that carrier (as compared to the other carriers), so that fewer parity bits will have to be truncated. This approach would allow for more robust error correction coding on the identified problematic carrier, and thus "balance" the HARQ performance across the multiple aggregated carriers.

Another weighting factor strategy may be to allocate larger soft buffer sizes to carriers experiencing good channel conditions in order to optimize system capacity by supporting the transmission of larger transport block sizes in particular when closed loop MIMO (transmission mode 4) is used on these good carriers. Any remaining soft buffer memory can then be assigned to carriers experiencing poorer channel conditions which may be limited to non-closed loop MIMO modes and/or smaller transport block sizes for robust transmissions. For example, with carrier aggregation deployments, the primary component carrier (PCC) of a set of aggregated carriers for a particular UE may be provisioned to be the most robust carrier with the largest coverage area. In such a situation, it may be desirable for this PCC to have a larger weighting factor for soft buffer partitioning purposes as compared to the other secondary component carriers (SCC) for that UE.

In yet another strategy, different carriers may be used to carry different types of traffic with different desired Quality of Services, so it may also be desirable to be able to customize the soft buffer sizes for particular carriers in such a scenario.

To illustrate selected embodiments where carrier-dependent relative weighting factors are used to determine the soft buffer sizes for each aggregated carrier, reference is again made to FIG. 1 which shows that the UE 10 which is configured to operate in one of the Release 10 UE categories using one or more buffer partition modules 121-122. As depicted, buffer partition modules 121-122 respectively calculate the soft buffer size ($N_{IR,k}$ bits) for transport blocks on the $k^{th}$ carrier using Equations 4 and 5 set forth below.

$$N_{IR,k} = \left\lfloor \frac{N_{soft}}{\left(\sum_{m=0}^{N_{carrier}-1} K_{MIMO,m} \cdot W_m \cdot \atop \min(M_{DL\_HARQ,m}, M_{limit,m})\right) / W_k} \right\rfloor \quad \text{Equation 4}$$

$$N_{IR,k} = \left\lfloor \frac{N_{soft}}{K_{MIMO,k}\left(\sum_{m=0}^{N_{carrier}-1} \cdot W_m \cdot \atop \min(M_{DL\_HARQ,m}, M_{limit,m})\right) / W_k} \right\rfloor \quad \text{Equation 5}$$

The first equation (Equation 4) removes the impact of MIMO transmission modes on soft buffer sizes. That is, for example, the soft buffer sizes for transport blocks on a 20 MHz carrier configured with a MIMO transmission mode (i.e. a maximum of two transport blocks per HARQ process) would be the same size as for a 20 MHz carrier configured with a non-MIMO transmission mode (i.e. a maximum of one transport block per HARQ process). The second equation (Equation 5) follows the Rel-8 approach of dividing the soft buffer sizes for HARQ processes on a carrier configured with a MIMO transmission mode (i.e. a maximum of two transport blocks per HARQ process) in half. As will be appreciated, buffer partition modules 121 and 122 respectively use carrier-dependent relative weighting factors to partition the soft buffer under the algorithmic requirements of either Equation 4 or Equation 5, and the UE 10 may have either or both equations available for selection when buffer partitioning is performed.

In Equations 4 and 5, $N_{soft}$ is the total number of soft bits for the UE category (see Table 1). $K_{MIMO,k}$ is equal to 2 if the $k^{th}$ carrier of the UE is configured to receive PDSCH transmissions based on transmission modes 3 or 4 (i.e. maximum of 2 transport blocks per HARQ process), and is equal to 1 for all other transmission modes (i.e. maximum of 1 transport block per HARQ process). $W_k$ is the relative weighting factor for the $k^{th}$ carrier. $M_{DL\_HARQ,k}$ is the maximum number of DL HARQ processes for the $k^{th}$ carrier as defined in 3GPP TS Section 36.213, §7. In Rel-8, the maximum number of DL HARQ processes for FDD is 8, and the maximum number of DL HARQ processes for TDD depends upon the uplink:downlink (UL:DL) subframe configuration. In another embodiment, a different maximum number of DL HARQ processes for FDD/TDD can be introduced, especially for different carriers. For example, some subframes on particular carriers may never contain a scheduled PDSCH transmission if these subframes are used for Multimedia Broadcast/multicast Single Frequency Network (MBSFN) or as almost blank subframes for inter-cell interference mitigation. In this scenario, the use of a smaller maximum number of DL HARQ processes allows the individual soft buffer size to be increased (since the same number of total soft bits is divided by a smaller number of DL HARQ processes). The number of actual DL HARQ processes for a particular carrier could be signaled by the eNB or determined by the UE by using information about a carrier's MBSFN subframe or almost blank subframe configuration. In the case that the HARQ soft buffers for the downlink backhaul of a Relay Node using carrier aggregation on the backhaul are considered, $M_{DL\_HARQ\_RN,k}$ is the number of DL HARQ processes for the $k^{th}$ carrier on the relay backhaul link. This quantity may be dependent on the number (or percentage) of allocated backhaul DL subframes or may be fixed for simplicity. For example, subframes 0, 4, 5, 9 cannot be used as MBSFN subframes in an FDD system (downlink relay backhaul transmissions from the donor eNB to the relay node will occur in subframes that are configured as MBSFN subframes), but other subframes could be allocated as relay backhaul subframes. For determining appropriate soft buffer sizes and partitions for Relay Nodes, $M_{DL\_HARQ,m}$ in Equations 4 and 5 would be replaced by $M_{DL\_HARQ\_RN,m}$. $M_{limit,k}$ is a constant giving the maximum number of HARQ soft bit buffers for the $k^{th}$ carrier, (Note that this quantity may be different from the maximum number of HARQ processes for the $k^{th}$ carrier.) In Rel-8, $M_{limit}$ is equal to 8, although a different value for each carrier's $M_{limit,k}$ could potentially be used for Rel-10. $M_{limit,k}$ could be defined in the standard, be broadcast within system information, be provided via UE-specific signaling, or be implicitly derived from other parameters that the UE has obtained or been provided with. $N_{carrier}$ is the total number of carriers for the UE.

When using carrier-dependent relative weighting factors to partition the soft buffer for each aggregated carrier, the access device 20 may directly or indirectly communicate the carrier-dependent weighting factors to each UE (e.g., 10) which is configured for carrier aggregation. For example, the carrier weighting factors could be communicated using dedicated RRC signaling to provide UE-specific carrier weighting factors to a particular UE. This RRC signaling could be the signaling used to configure carrier aggregation for the UE. Specifically, the UE-specific carrier weighting factors are included in the RRC signaling that adds a SCC to the UE or in the RRC signaling that modifies the configuration of an already-configured component carrier (PCC or SCC) of the UE.

If a UE did not receive such dedicated signaling, or if the UE receives an explicit indication, command or flag from the network, the UE could fall back and use another method for determining the carrier-dependent weighting factors. Other options for conveying the carrier-dependent weighting factors to the UE(s) include, but are not limited to, using equal partitioning based on the number of configured component carriers by setting the carrier weighting factors $W_k$ equal to 1 for all values of k, using implicitly-derived weighting factors that are dependent upon the carrier bandwidths, and using explicitly-broadcast weighting factors that are contained in the System Information Blocks. This may be used to minimize signaling overhead in case that an implicit scheme for deriving the weighting factors is the network operator's preferred option.

In the event UE-specific carrier weighting factors are used, the carrier weighting factors for two UEs may be the same or may be different, at the discretion of the serving access device and based on factors such as the number and characteristics of aggregated carriers for each UE, the relative channel condition, the position (or distance) of a particular UE relative to the eNB, etc.

Alternatively, cell-specific weighting factors could be broadcast in the system information so that the broadcast weighting factors are common to all UEs in the cell. The system information for each carrier could contain the weighting factor for that particular carrier. These weighting factors could either be explicitly broadcast (as a separate new information field in one of the system information blocks (e.g. SIB2)) or could be implicitly derived from an existing information field within the system information, such as by deriving the carrier bandwidth for each aggregated carrier from an existing system information parameter. As will be appreciated, other implicit weighting schemes may be applied, specified or configured. The use of an implicit weighting scheme could be the default behavior on a detected absence of an explicit configuration or could be allowed/disallowed via an explicit indication, command or flag contained either within the broadcast system information, or communicated from the network to the UE by any other suitable means. Such a simple "switch" between implicit and explicit CC weightings could be used to minimize signaling overheads in the case that the implicit scheme is the network operator's preferred option. Cell-specific weighting factors may also be signaled to a UE via dedicated signaling (rather than broadcast), especially for SCC. System information for these secondary carriers is generally provided via dedicated RRC signaling to each UE configured with that secondary carrier.

If cell-specific carrier weighting factors are used, it will be appreciated that two UEs of the same UE category and using the same set of aggregated carriers will partition their soft buffers equivalently to each other. However, even if cell-specific carrier weighting factors are used, then the soft buffer partitions for two UEs may be different from each other if the UEs operate in different UE categories, in which case they may have a different total number of soft bits available. In addition, if the UEs have a different set of aggregated carriers, then the soft buffer partitions will also be different. Also, the soft buffer partitions will be different for UEs that have different transmission modes configured for one or more carriers, and the transmission mode has an impact on the soft buffer size. For example, UE 1 might be configured to use transmission mode 3 (with a maximum of two transport blocks per HARQ process) on a particular carrier, while UE 2 might be configured to use a different transmission mode which is non-MIMO (and with only one transport block per HARQ process) on the same carrier.

Soft Bit Buffer Partitioning Based on Relative Carrier Bandwidths

One specific implementation for using carrier-dependent weights to partition the soft buffer is to use the relative weighting of each aggregated carrier's bandwidth as compared to the total combined bandwidth of all aggregated carriers. To implement the bandwidth-weighting scheme, the UE 10 includes one or more buffer partition modules 123-124 which calculate the soft buffer size ($N_{IR,k}$ bits) for transport blocks on the $k^{th}$ carrier using carrier bandwidth information in Equations 6 or 7 as set forth below:

$$N_{IR,k} = \left\lfloor \frac{N_{soft}}{\left( \sum_{m=0}^{N_{carrier}-1} \frac{K_{MIMO,m} \cdot N_{RB,m}^{DL} \cdot}{\min(M_{DL\_HARQ,m}, M_{limit,m})} \right) / N_{RB,k}^{DL}} \right\rfloor \quad \text{Equation 6}$$

-continued $$N_{IR,k} = \left\lfloor \frac{N_{soft}}{K_{MIMO,k} \left( \sum_{m=0}^{N_{carrier}-1} \cdot N_{RB,m}^{DL} \cdot \min(M_{DL\_HARQ,m}, M_{limit,m}) \right) \Big/ N_{RB,k}^{DL}} \right\rfloor \quad \text{Equation 7}$$

As will be appreciated, Equations 6 and 7 parallel, respectively, Equations 4 and 5 by using the same algorithmic approach and terms, except that the relative weighting term $W_k$ is replaced with a carrier bandwidth factor $N_{RB,k}^{DL}$ which may represent the number of resource blocks in the bandwidth of the $k^{th}$ carrier. For example, this could be {6, 15, 25, 50, 75, 100} for carrier bandwidths of {1.4, 3, 5, 10, 15, 20 MHz}, respectively. Thus, the bandwidth-weighting solutions provided in Equations 6 and 7 provide a special case of the carrier-dependent weighting solutions provided in Equations 4 and 5, where the relative weighting factors are equal to the respective carrier bandwidths (i.e. $N_{RB,k}^{DL}=W_k$). Note that Equations 6 and 7 naturally fall back to the desired result of equally dividing the total available soft bits between multiple carriers if all of the carriers have the same bandwidth.

As seen from the foregoing, buffer partition modules 123 and 124 use carrier bandwidth factors to partition the soft buffer under the algorithmic requirements of either Equation 6 or Equation 7, respectively, so that the UE 10 may have either or both equations available for selection when buffer partitioning is performed.

In cases where the supportable peak data rate can be increased by using a large number of layers (e.g., for spatial multiplexing), an additional or alternative partition factor would be to include the number of spatial layers as a factor for calculating the soft buffer size if each component carrier supports a different number of layers.

The use of generalized carrier-dependent relative weighting factors (per Equations 4-5) overcomes the limitation with bandwidth weighting schemes (per Equations 6-7) where there may or may not be a close relationship between transport block size and carrier bandwidth, depending on network configuration and scheduling policy. In addition, the generalized carrier-dependent relative weighting factor scheme can use additional signaling to provide increased flexibility and control over the distribution of HARQ memory to each component carrier.

HARQ Buffer Repartitioning Upon Carrier-Related Reconfiguration

In accordance with selected embodiments of the present invention, the partitioning equations described hereinabove may be selectively applied under predetermined rules to reduce the adverse effects of any carrier-related reconfigurations at the UE on the HARQ soft bit buffer partitioning. In particular, it will be appreciated that a number of carrier-related configuration changes can trigger repartitioning of the soft bit buffers, including changes in the number of configured carriers. Repartitioning can also be caused by changes in the number of activated carriers which are a subset of the configured carriers that have been prepared by the access device with explicit or implicit control signaling that activates or deactivates a configured carrier to receive downlink data. In addition, repartitioning can be caused by reconfiguration of the transmission mode of one or more carriers such that the maximum number of transport blocks per HARQ process of that carrier changes from 1 to 2 (or vice versa). In the case of a Relay Node, repartitioning can also be caused when the number of HARQ processes changes due to the reconfiguration of the backhaul DL subframes. Finally, repartitioning can be caused by changes in other factors that may impact the weighting carrier-related weighting factors described herein.

The problem posed by buffer repartitioning is that the soft bit buffer for the HARQ process being repartitioned may be flushed upon repartitioning so that the current contents of the soft bit buffer(s) for that HARQ process are deleted. This flushing means that that any previously-transmitted HARQ information within the soft bit buffer is lost. In addition, if the lost HARQ information must then be retransmitted at a higher layer (Layer 2 ARQ via RLC), this Layer 2 retransmission results in greater use of over-the-air resources and increased latency on the affected traffic. Consequently, it is desirable to limit the effects (e.g., flushing) of a carrier-related reconfiguration only to the soft buffers of the affected carrier, if possible, rather than to have the effects apply to the soft buffers of all of the carriers.

To reduce the impact of any repartitioning on HARQ operation and downlink transmission throughput, the UE 10 may be configured to apply one or more rules 130-134 to the partition equations 120-124 implemented by the HARQ process decoder 116. In selected embodiments, a first rule 130 is implemented to specify that the total soft bits are partitioned based on the number of configured carriers for a UE. Under this "configured carrier" rule 130, the $N_{carrier}$ term in Equations 4-7 is equal to the number of configured carriers for the UE. This rule exploits the fact that changes in the number of configured carriers occur less frequently than changes in the number of activated carriers and/or the transmission mode for a particular carrier. If the soft bits are partitioned based on the number of configured carriers for a UE, then repartitioning (and flushing) of all carriers' HARQ buffers will not be necessary whenever a carrier is activated or deactivated. Instead, repartitioning of all of the HARQ buffers will only be required when a carrier is added or removed from the set of configured carriers. With the "configured carrier" rule 130, any soft bit storage allocated to a configured but deactivated carrier will essentially be "wasted" and may therefore result in poorer HARQ performance on the activated carriers.

Another way to reduce the impact of any repartitioning on HARQ operation is to configure the UE 10 to apply a second rule 131 to require that the total soft bits are partitioned based on the number of activated carriers for a UE. Under this "activated carrier" rule 131, the $N_{carrier}$ term in Equations 4-7 is equal to the number of activated carriers for the UE. This approach makes maximum use of the available soft bits by ensuring that all of the soft bit storage is available for use only by activated carriers, and that none of this soft bit storage is being "wasted" by being allocated to currently-deactivated carriers. However, with the "activated carrier" rule 131, all of the soft bit buffers for all of the HARQ processes on all of the carriers will need to be flushed and repartitioned whenever a carrier is activated or deactivated. In addition, there can be problems if a carrier activation/deactivation command is incorrectly perceived by the access device 20 to have been missed by the UE 10 (ACK-to-NACK error) or incorrectly perceived by the access device 20 to have been successfully received by the UE 10 (NACK-to-ACK error). In these situations, the HARQ buffer partitioning (and the actual parity bits that are transmitted over the air) may be misaligned between the access device 20 and UE 10. This could quite possibly result in complete HARQ buffer corruption at the UE 10, with a corresponding negative impact on over-the-air throughput.

Soft buffer repartitioning effects may also be reduced by configuring the UE 10 to apply a third rule 132 to require that a predetermined number of soft bits are always reserved for a designated carrier, such as a PCC. Under this "primary carrier" rule 132, the soft buffer is divided into a PCC portion (that is dedicated to the PCC) and a remainder portion for the secondary component carriers (that is partitioned by one of the partition equations, such as Equation 6). This approach exploits the fact that the PCC will not change often and will be reconfigured less frequently than the secondary carriers. In an example implementation, the number of soft bits for the PCC portion can be the same as the number of soft bits that would be obtained for a certain Rel-8 category (even if the Rel-10 UE belongs to a Rel-10 UE category), provided that the total number of soft bits for that Rel-8 category were partitioned according to the Rel-8 approach. In other implementations, the number of soft bits for the PCC portion can be a predetermined number. The remainder portion bits (excluding the soft bits for the PCC portion) can be the available soft bits for SCC(s). Alternatively, the number of soft bits available for SCC(s) can be a predetermined number. In either case, when a SCC is added or removed (or activated/deactivated), only the soft bits that are allocated to secondary carriers are repartitioned, and the soft buffer repartitionings on the secondary carriers would not affect the soft buffers on the primary carrier. With this arrangement, the access device 20 would only schedule transmissions to the UE 10 on the primary carrier during any secondary carrier configuration/activation/deactivation window, since those HARQ soft buffers will not be affected by the buffer repartitioning.

The UE 10 may also be configured to reduce soft buffer repartitioning effects by applying a fourth rule 133 to require that the UE 10 receive an explicit repartition instruction when signaling or other information related to carrier reconfiguration is received by a UE. Under this "repartition instruction" rule 133, the access device 20 would instruct the UE 10 to maintain the current soft bit buffer partitioning and not to switch to a new partitioning, even though the carriers for a particular UE 10 are being reconfigured, activated, deactivated, etc. Such a "repartition instruction" would be sent if the access device 20 determines that it may not actually be necessary for the UE 10 to repartition its soft bit buffers. For instance, the access device 20 may determine that satisfactory HARQ performance following the carrier reconfiguration can still be obtained without the need for a soft bit buffer repartition (and buffer flush). In this situation, the access device 20 would indicate to the UE 10 to maintain the current soft bit buffer partitioning and not to switch to a new partitioning. If this information field is absent or set to a different value, then this would indicate to the UE 10 that a new soft bit buffer partitioning should be applied. In an example implementation, the explicit repartition instruction is included as an additional information field in the carrier reconfiguration RRC message indicating whether or not the UE should repartition its HARQ soft bit buffers. With the "repartition instruction" rule 133, the UE 10 would always have to repartition its HARQ soft bit buffers in the event of a carrier addition (i.e. configuration of a new carrier).

In yet another embodiment, the UE 10 may be configured to reduce soft buffer repartitioning effects by applying a fifth rule 134 whereby the total soft bits are partitioned between carriers using a method that does not depend on the transmission modes for individual carriers. Because different carriers in a set of aggregated carriers may be configured with different transmission modes, this "transmission mode independent" rule 134 addresses the situation where a DL HARQ process for one or more of the aggregated carriers may need to buffer soft bits for either 1 or 2 transport blocks, depending upon the currently-configured transmission mode (non-MIMO versus MIMO). In addition, it is possible that the transmission mode of a particular aggregated carrier may need to be reconfigured from 1 to 2 transport blocks per HARQ process or vice versa. In such a situation, the soft bit buffers of the HARQ processes of that carrier may need to be repartitioned, and therefore flushed. With the "transmission mode independent" rule 134, the UE 10 would be configured to limit the buffer flushing only to the HARQ processes of that reconfigured carrier, rather than all of the HARQ processes of all of the carriers for that UE, by choosing the appropriate partition buffer module. For example, buffer partition modules 122 and 124 implement Equation 5 and Equation 7, respectively, which each provide specific embodiments of this proposal whereby a change in the transmission mode on one carrier (and hence the value of $K_{MIMO, k}$ for that carrier) causes only the soft buffers for that carrier to be repartitioned so that the soft bit buffers for the other carriers are not repartitioned.

Figure 5:
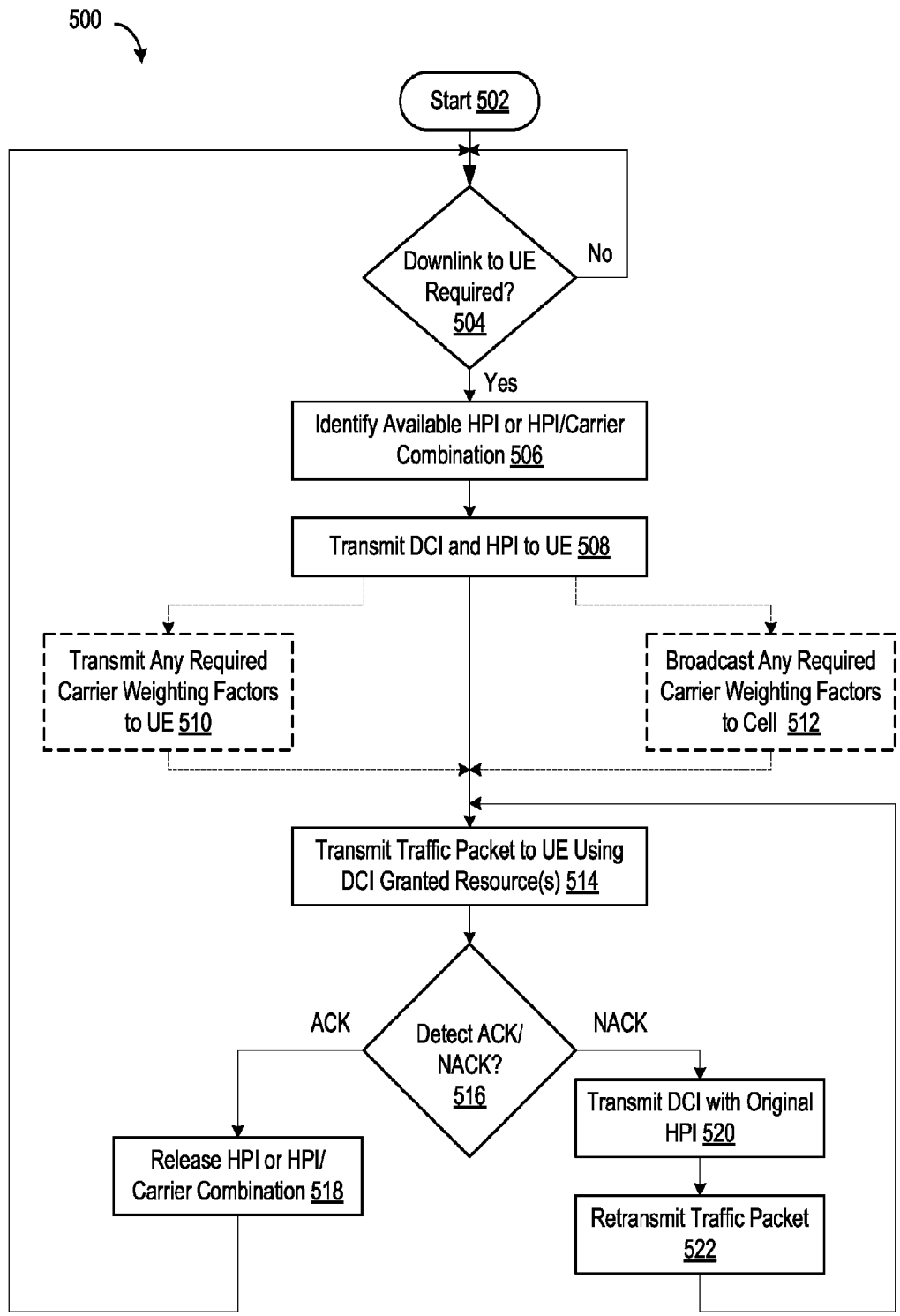
FIG. 5 is a flow chart illustrating a process that may be performed by an access device to enable a user agent to manage HARQ buffer size allocation for use with transmitting transport blocks over aggregated carriers.

Referring now to FIG. 5, there is depicted in flow chart form a procedure 500 performed by an access device 20 to enable a UE 10 to manage HARQ buffer size allocation for use with transmitting transport blocks over aggregated carriers. Once the procedure starts (step 502), the access device determines at decision block 504 whether or not downlink data transmission to the UE is required. Where downlink transmission is not required, control continues to loop back through decision block 504. However, once downlink transmission is required, control passes to block 506 where the access device identifies an available HPI or HPI/carrier combination. To this end, the access device keeps track of HPIs or HPI/carrier combinations currently being used with any UE to track previously transmitted traffic packets. At block 506, the access device selects one of the available (i.e., currently unused) HPI or HPI/carrier combinations, and then creates and transmits a DCI packet along with the selected HPI to the UE at block 508. At this stage, the access device may determine that aggregated carriers will be used, in which case the required DCI and HPI information is transmitted or otherwise conveyed for the selected carriers.

In selected embodiments where carrier weighting factors are to be transmitted from the access device to the UE, the access device may optionally transmit the carrier weighting factors as indicated with the dashed blocks 510 or 512. For example, the access device can transmit any required carrier weighting factors to the UE at block 510, such as by using dedicated RRC signaling. Alternatively, the access device can broadcast any required carrier weighting factors to the cell in which one or more UEs are located at block 512. Of course, the carrier weighting factors need not be explicitly signaled by the access device when the UE is able to derive the required weighting information from the other control information transmitted by the access device. For example, the UE can determine the bandwidth information for each of the aggregated carriers from the System Information Block control information provided by the access device.

Regardless of how the carrier weighting information is obtained by the UE, the access device transmits a traffic packet to the UE at process block 514 using the PDSCH channel specified by the DCI specific schedule and the selected carrier frequency or frequencies. At decision block 516, the access device monitors the uplink feedback (e.g., the PUCCH channel) for an ACK or a NACK. When an ACK is received (ACK outcome from decision block 516), control passes to block 518 where access device renders the HPI or HPI/channel combination associated with the received ACK available. After block 518, control passes back to decision block 504. However, if and when a NACK is received (NACK outcome from decision block 516), control passes to block 520 where the access device transmits another DCI packet including the original HPI on the control channel (e.g., PDCCH), and at block 522, the access device retransmits the original traffic packet that was incorrectly received by the UE on the data channel (e.g., PDSCH). As will be appreciated, if there is no ACK or NACK received, the access device continues to monitor the uplink feedback channel for an ACK or a NACK for at least a predetermined time duration, after which point the access device may assume that the data packet was not successfully received by the UE and proceed accordingly with a retransmission procedure. As will be appreciated, the procedure 500 is performed for each original traffic packet transmitted on a carrier to a UE so that multiple procedures like procedure 500 may be performed simultaneously in the case of carrier aggregation.

Figure 6:
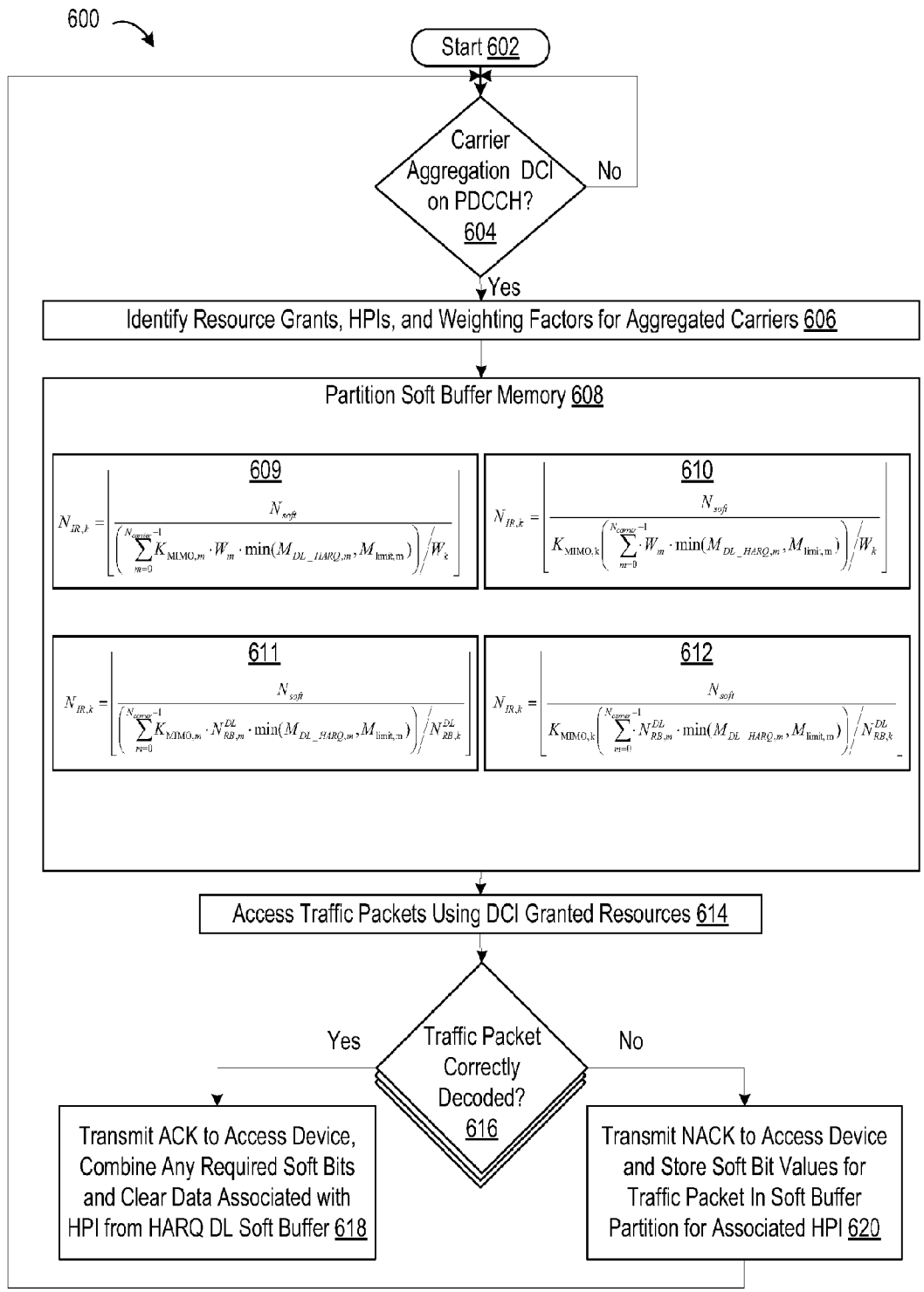
FIG. 6 is a flow chart illustrating a process that may be performed by a user agent to manage HARQ soft buffer partitioning for use with decoding transport blocks transmitted over aggregated carriers.

Referring now to FIG. 6, there is depicted in flow chart form a procedure 600 performed by a user equipment 10 to manage HARQ soft buffer partitioning for use with decoding transport blocks transmitted over aggregated carriers. As will be appreciated, procedure 600 may be performed, in part, in parallel with the procedure 500 shown and described in FIG. 5. Once the procedure starts (step 602), the UE device monitors the control channel (e.g., PDCCH) to detect any DCI signaling indicating that carrier aggregation will be used to transmit data to the UE. If not, the procedure continues to monitor the control signal to detect other DCI signals. However, if carrier aggregation is indicated, control passes to block 606 where the UE is configured to identify the downlink resources scheduled for carrier aggregation in the DCI packet(s). In addition to identifying the downlink resources scheduled, the UE may use the DCI packet information to determine whether or not the traffic packet associated with the resource grant is new data or retransmitted data by examining a new data indicator (NDI) which is provided for that purpose. In addition, the UE can identify the HPI specified by the DCI packet information. Finally, the UE identifies any carrier-dependent weighting factors for aggregated carriers, either directly or indirectly from explicit control signaling by the access device.

At block 608, the UE is configured to partition the soft buffer memory as a function of the carrier-related weighting factors in such a manner that efficient HARQ operation may be realized on multiple aggregated carriers of potentially different bandwidths and/or carrier performance (e.g. differing channel conditions and/or interference levels). To this end, there have been disclosed and described herein a number of partitioning equations which may be implemented by the UE to calculate the soft buffer size ($N_{IR,k}$ bits) for transport blocks on the $k^{th}$ carrier. For example, the partition step 608 may choose partitioning equation 609 to use carrier-dependent weighting factors $W_m$ in a buffer partition equation which removes the impact of MIMO transmission modes on soft buffer sizes, such as described hereinabove with reference to Equation 4. Alternatively, the partition step 608 may choose partitioning equation 610 which uses carrier-dependent weighting factors $W_m$ in a buffer partition equation which divides the soft buffer sizes for HARQ processes on a carrier configured with a MIMO transmission mode in half, such as described hereinabove with reference to Equation 5. In other embodiments, the partition step 608 may choose partitioning equation 611 to use relative carrier bandwidth information in a buffer partition equation, such as described hereinabove with reference to Equation 6, or may alternatively choose a partitioning equation 612 to use relative carrier bandwidth information in a buffer partition equation, such as described hereinabove with reference to Equation 7. As will be appreciated, the application of the partitioning equations 609-612 may be governed by one or more application rules in order to govern when buffer repartitionings occur in order to reduce the impact of any repartitionings on the HARQ operation and downlink transmission throughput.

At block 614, the UE is configured to access the traffic packets transmitted on the aggregated carriers via the resource grants identified at block 606. As indicated by the plurality of detection decision blocks 616 in the procedure 600, the UE determines if the new data or original traffic packet received on each of the aggregated carriers has been correctly decoded.

Where the original traffic packet is received correctly (affirmative outcome to decision block 616), the UE is configured to transmit an ACK (block 618) back to the access device, after which control passes back to block 604 where the UE continues to monitor for new DCI on the PDCCH. In the event that the correctly received data packet is a HARQ retransmission packet, it is combined with any soft bits stored in the partitioned HARQ downlink soft buffer for the indicated HPI at block 618. Upon successful transmission of the data packet for a given HPI, any corresponding soft bit data in the HARQ downlink soft buffer is cleared from the buffer at block 618.

If the UE determines that the original traffic packet was not correctly received (negative outcome to decision block 616), the UE is configured to transmit a NACK (block 620) back to the access device, after which control passes back to block 604 where the UE continues to monitor for new DCI on the PDCCH. At block 620, any soft bits associated with the incorrectly received data packet are stored in the HARQ downlink soft buffer for the indicated HPI.

As seen from the foregoing, the disclosed buffer partitioning techniques provide significant benefits to the HARQ decoding process. For example, the carrier bandwidth based soft bit partitioning scheme adapts soft buffer sizes to the expected relative sizes of transport blocks that could be expected to be received on each carrier under certain network or scheduler implementation constraints. This may be used to help provide equal HARQ performance across all carriers when carriers of different bandwidths are aggregated. In addition, the generalized relative weighting scheme allows the access device to customize the soft buffer sizes to the anticipated performance of each carrier and/or scheduling policies adopted by the network operator, and could help to provide equal HARQ performance across all carriers when channel conditions and/or interference conditions and/or scheduling policies are different for different aggregated carriers. Finally, the proposed rules covering soft bit repartitioning when carrier-related reconfigurations occur help to minimize the impact of any buffer repartitioning (i.e. buffer/process flushes) and ensure that the UE follows an expected defined behaviour in these situations.

Figure 7:
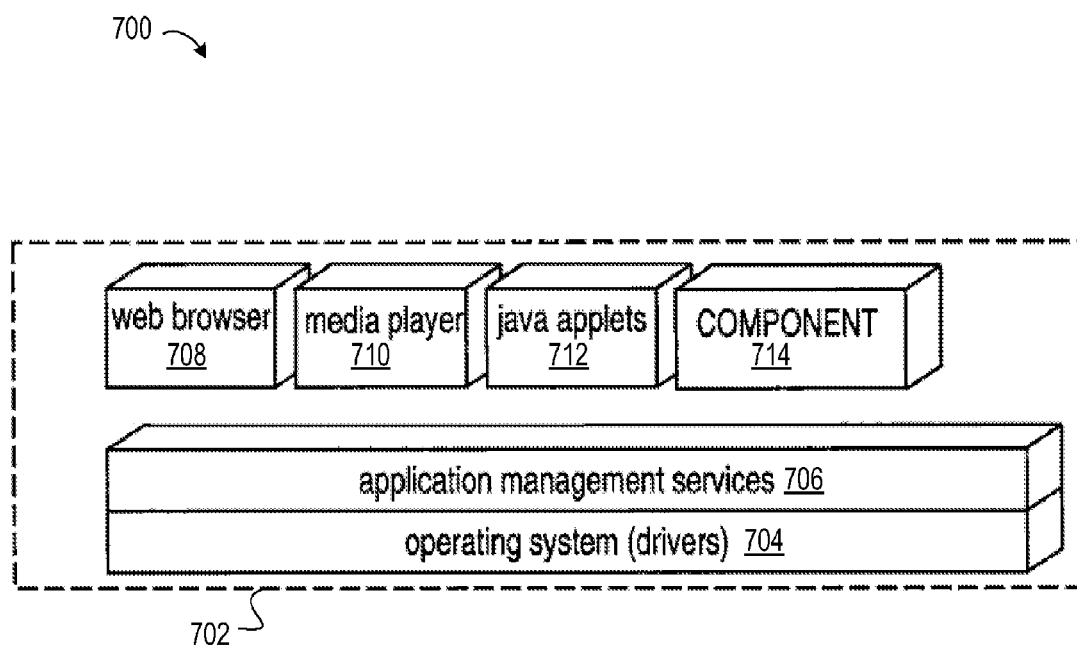
FIG. 7 is a diagram of a software environment that may be implemented on a user agent and/or access device operable for some of the various embodiments of the disclosure.

FIG. 7 is a diagram 700 of a software environment 702 that may be implemented on a user equipment device and/or access device operable for some of the various embodiments of the disclosure. One or more processing resources at the UE device or access device execute operating system drivers 704 that provide a platform from which the rest of the software operates. The operating system drivers 704 provide drivers for the device hardware with standardized interfaces that are accessible to application software. The operating system drivers 704 include application management services ("AMS") 706 that transfer control between applications running on the device. In UE instances, the software environment 702 includes a web browser application 708, a media player application 710, and Java applets 712 are provided as device applications. The web browser application 708 configures the UE device to operate as a web browser, allowing a user to enter information into forms and select links to retrieve and view web pages. The media player application 710 configures the UE to retrieve and play audio or audiovisual media. The Java applets 712 configure the UE device to provide games, utilities, and other functionality. Finally, the component 714 may provide the soft buffer partitioning functionality described herein.

Figure 8:
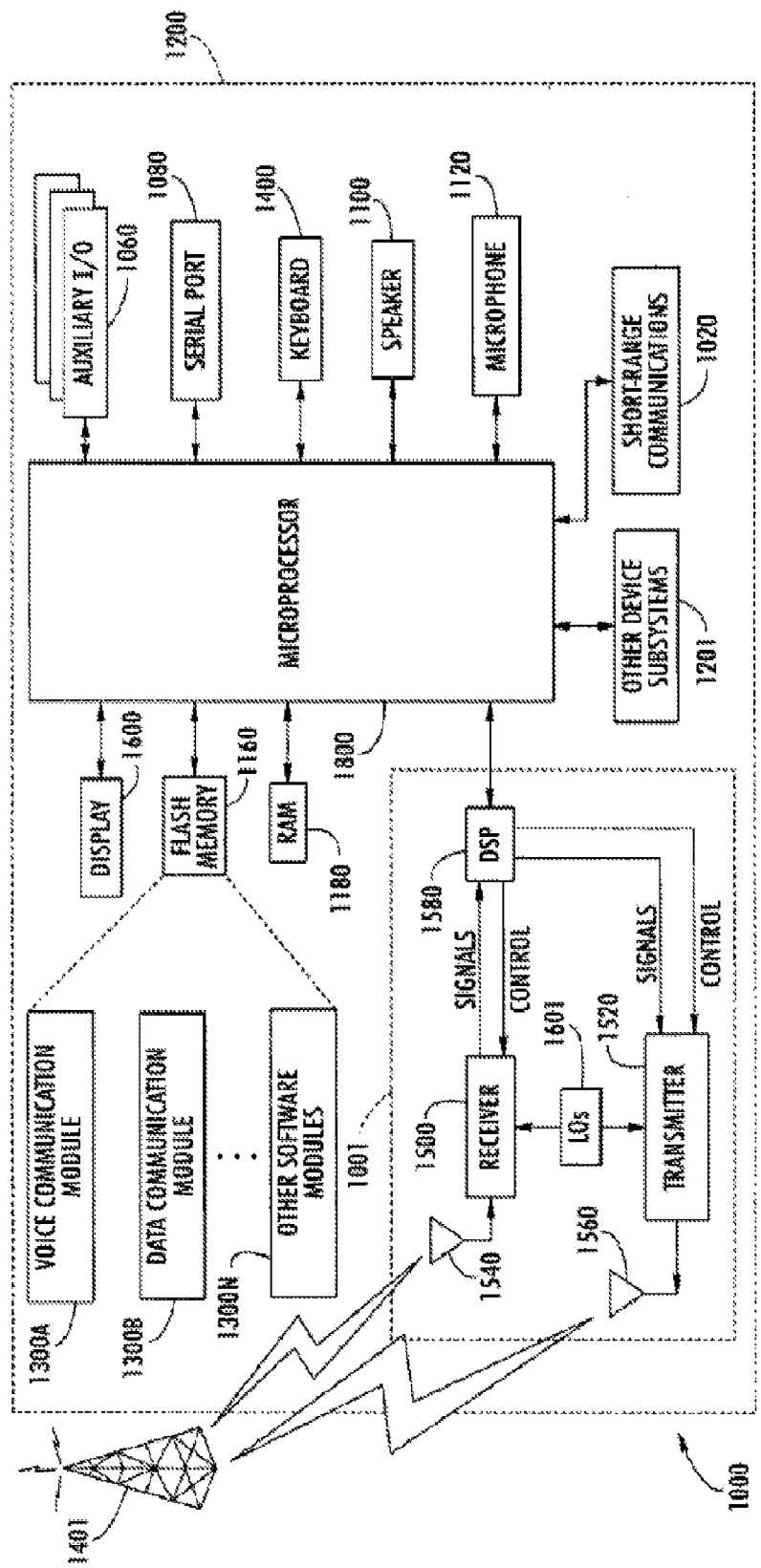
FIG. 8 is a schematic block diagram illustrating exemplary components of a mobile wireless communications device which may be used with selected embodiments of the present invention.

Referring now to FIG. 8, there is shown a schematic block diagram illustrating exemplary components of a mobile wireless communications device 1000 which may be used with selected embodiments of the present invention. The wireless device 1000 is shown with specific components for implementing features described above. It is to be understood that the wireless device 1000 is shown with very specific details for exemplary purposes only.

The device 1000 illustratively includes a housing 1200, a keypad 1400, and an output device 1600. The housing 1200 may be elongated vertically, or may take on other sizes and shapes (including clamshell housing structures). The keypad 1400 may be implemented as a keypad, touchpad, or equivalent alphanumeric input, and may include a mode selection key, or other hardware or software for switching between text entry and telephony entry. The output device shown is a display 1600, which may be a full graphic LCD, though other types of output devices may be utilized. A processing device 1800 contained within the housing 1200 is communicatively coupled with the keypad 1400 and the display 1600. The processing device 1800 controls the operation of the display 1600, as well as the overall operation of the mobile device 1000, in response to actuation of keys on the keypad 1400 by the user.

As illustrated schematically in FIG. 8, the mobile device 1000 may include other parts or components, such as of a communications subsystem 1001, a short-range communications subsystem 1020, keypad 1400, display 1600, one or more input/output devices 1060, 1080, 1100 and 1120, memory devices 1160, 1180 including a flash memory 1160 and a Random Access Memory (RAM) 1180, and various other device subsystems 1201. Though not shown, the wireless device 1000 may have a battery to power the active elements of the wireless device 1000. The mobile device 1000 is preferably a two-way RF communications device having voice, data, and/or video communications capabilities. In addition, the mobile device 1000 preferably has the capability to communicate with other computer systems via the Internet or other communication networks.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile memory, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is in some embodiments capable of organizing and managing data items, such as e-mail, calendar events, voice mails, appointments, and task items. The PIM application is also in some embodiments capable of sending and receiving data items via a wireless network 1401. In some embodiments, the PIM data items are seamlessly integrated, synchronized and updated via the wireless network 1401 with the device user's corresponding data items stored or associated with a host computer system. As well, additional software modules, illustrated as another software module 1300N, may be installed during manufacture.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. In some embodiments, the communication subsystem 1001 includes a separate antenna arrangement (similar to the antennas 1540 and 1560) and RF processing chip/block (similar to the Receiver 1500, LOs 1601 and Transmitter 1520) for each RAT, although a common baseband signal processor (similar to DSP 1580) may be used for baseband processing for multiple RATs. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 1001 may also be designed to operate with an 802.11 Wi-Fi network, and/or an 802.16 WiMAX network. Other types of data and voice networks, both separate and integrated, may also be utilized with the mobile device 1000. The mobile device 1000 may also be compliant with other communications standards such as 3GSM, 3GPP, UMTS, LTE Advanced, 4G, etc.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When required network registration or activation procedures have been completed, the mobile device 1000 may send and receive communications signals over the communication network 1401. Signals received from the communications network 1401 by the antenna(s) 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna(s) 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem 1020 enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

By now it should be appreciated that there is disclosed herein a method, apparatus, computer program product, and system for handling hybrid automatic repeat request (HARQ) operations for aggregated carrier. In the disclosed methodology, apparatus, computer program product, and system, a total number of soft buffer bits to be partitioned is determined or otherwise computed, such as by determining a user equipment category for a user equipment device selected to receive one or more transport blocks over the aggregated carriers. In other embodiments, the total number of soft buffer bits to be partitioned is determined by determining a total number of soft buffer bits to be used for the soft bit buffer; assigning a predetermined number of the total number of soft buffer bits to a primary component carrier, leaving a remainder number of soft buffer bits; detecting configuration information for a plurality of secondary component carriers; and assigning the remainder number of soft buffer bits as the total number of soft buffer bits to be partitioned among the plurality of secondary component carriers. In addition, carrier-dependent weighting factors are obtained that correspond respectively to the aggregated carriers, such as by obtaining a plurality of carrier-dependent weighting factors for a plurality of configured or activated aggregated carriers. In selected embodiments, the weighting factors can be obtained by receiving dedicated control signaling that conveys the plurality of carrier-dependent weighting factors, or by receiving a cell-specific broadcast of the plurality of carrier-dependent weighting factors, or by deriving the plurality of carrier-dependent weighting factors from cell-specific broadcast information. Based on this information, the total number of soft buffer bits is partitioned based at least in part on the carrier-dependent weighting factors to obtain a plurality of soft buffer partitions for the plurality of aggregated carriers which are sized based on relative carrier-dependent weighting factors. Generally speaking, the total number of soft buffer bits may be partitioned by selecting a soft buffer partition size for a kth carrier from the plurality of aggregated carriers by dividing a weighting factor for the kth carrier by a sum of all weighting factors for the aggregated carriers, such as by using any of Equations 4-7 set forth hereinabove. In addition, when any carrier-related reconfiguration is detected for a subset of the aggregated carriers that does not include all of the aggregated carriers, only the HARQ process information is manipulated that is stored in the one or more soft buffer partitions corresponding to the subset of aggregated carriers so that there is no manipulation of HARQ process information in the other soft buffer partitions. To this end, dedicated control signaling may be sent to indicate whether or not to repartition the total number of soft buffer bits in the event of reconfiguration of any one or more of the plurality of aggregated carriers.

There is also disclosed herein a user equipment device and method of operation for handling hybrid automatic repeat request (HARQ) operations for aggregated carrier. The disclosed UE device includes a processor and/or a HARQ subsystem configured to determine a total number of soft buffer bits to be partitioned for HARQ operations, such as by determining a user equipment category for the user equipment device that is configured to receive one or more transport blocks over the aggregated carriers. In addition, the processor and/or HARQ subsystem are configured to obtain a plurality of carrier-related properties (e.g., carrier-dependent weighting factors) corresponding respectively to the plurality of aggregated carriers by receiving dedicated control signaling or broadcast control signaling that conveys the plurality of carrier-related properties or by receiving information that may be used to derive the plurality of carrier-related properties. Alternatively, carrier-dependent weighting factors may be obtained that correspond respectively to the aggregated carriers, such as by obtaining a plurality of carrier-dependent weighting factors for a plurality of configured or activated aggregated carriers. The processor and/or HARQ subsystem are also configured to partition the total number of soft buffer bits among a plurality of aggregated carriers based at least in part on a plurality of carrier-related properties associated with the plurality of aggregated carriers to obtain a plurality of soft buffer partitions having relative sizes based on the plurality of carrier-related properties. Generally speaking, the total number of soft buffer bits may be partitioned by selecting a soft buffer partition size for a kth carrier from the plurality of aggregated carriers by dividing a weighting factor for the kth carrier by a sum of all weighting factors for the aggregated carriers, such as by using any of Equations 4-7 set forth hereinabove. In other embodiments, the total number of soft buffer bits to be partitioned is determined by determining a total number of soft buffer bits to be used for the soft bit buffer; assigning a predetermined number of the total number of soft buffer bits to a primary component carrier, leaving a remainder number of soft buffer bits; detecting configuration information for a plurality of secondary component carriers; and assigning the remainder number of soft buffer bits as the total number of soft buffer bits to be partitioned among the plurality of secondary component carriers. In the user equipment, the processor and HARQ subsystem may also be configured to detect a carrier-related reconfiguration for a subset of the aggregated carriers that does not include all of the aggregated carriers, and manipulate HARQ process information only in the one or more soft buffer partitions corresponding to the subset of aggregated carriers without manipulating HARQ process information in of the other soft buffer partitions. To this end, the UE equipment may be configured to receive a dedicated control signaling to indicate whether or not to repartition the total number of soft buffer bits in the event of reconfiguration of any one or more of the plurality of aggregated carriers.

In addition, there is disclosed herein a network element and method of operation for handling hybrid automatic repeat request (HARQ) operations for aggregated carrier. The disclosed network element (e.g., eNB) includes a processor and a communications subsystem for handling hybrid automatic repeat request (HARQ) operations by configuring a user equipment device to receive data packets on a plurality of aggregated carriers. The network element also transmits data packets to the user equipment device on the plurality of aggregated carriers, such as by transmitting dedicated control signaling that conveys the plurality of carrier-dependent weighting factors, or broadcasting the plurality of carrier-dependent weighting factors in a cell. In addition, the network element transmits a plurality of carrier-dependent weighting factors to the user equipment device which correspond respectively to the plurality of aggregated carriers, where the carrier-dependent weighting factors are transmitted for use by the user equipment device in partitioning a total number of soft buffer bits based at least in part on the carrier-dependent weighting factors to obtain a plurality of soft buffer partitions for the plurality of aggregated carriers which are sized based on relative carrier-dependent weighting factors.

In still further embodiments, computer program product is disclosed that includes a non-transitory computer readable storage medium having computer readable program code embodied therein with instructions which are adapted to be executed to implement a method for operating user equipment (UE) and/or an access device (e.g., radio access network, such as an eNB) to handle hybrid automatic repeat request (HARQ) operations for aggregated carriers, substantially as described hereinabove. As disclosed, the computer program controls the processor to perform a method for handling HARQ operations for aggregated carriers by determining a total number of soft buffer bits to be partitioned for HARQ operations; obtaining a plurality of carrier-related properties corresponding respectively to a plurality of aggregated carriers; and partitioning the total number of soft buffer bits among the plurality of aggregated carriers based at least in part on the plurality of carrier-related properties associated with the plurality of aggregated carriers to obtain a plurality of soft buffer partitions having relative sizes based on the plurality of carrier-related properties. The computer program obtains the plurality of carrier-related properties by controlling the processor to receive dedicated control signaling or broadcast control signaling that conveys the plurality of carrier-related properties or receiving information that may be used to derive the plurality of carrier-related properties. Alternatively, the computer program controls the processor to derive bandwidth information for each of the aggregated carriers. As for partitioning the soft buffer bits, the computer program controls the processor to select a soft buffer partition size for a kth carrier from the plurality of aggregated carriers by dividing a weighting factor for the kth carrier by a sum of all weighting factors for the aggregated carriers, such as by using any of Equations 4-7 set forth hereinabove.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a soft buffer partitioning scheme which uses carrier-related weighting factors to partition the total available soft bits for HARQ downlink processes, the present invention is not necessarily limited to the example embodiments which illustrate inventive aspects of the present invention that are applicable to a wide variety of signaling schemes and applications. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

APPENDIX

This appendix sets forth proposed changes to selected 3GPP TS reports and specifications that relate to the management of HARQ soft buffers to partition the total available number of HARQ soft bits between multiple buffers on multiple carriers in the case of carrier aggregation (E-UTRA, Rel-10).

////////////////Proposal #1 : Soft Bit Buffer Partitioning Based on Relative Carrier Bandwidths////////////////////////////////////

5.1.4.1.2 Bit collection, selection and transmission

The circular buffer of length $K_w = 3K_\Pi$ for the $r$-th coded block is generated as follows:

$$w_k = v_k^{(0)} \text{ for } k = 0, \ldots, K_\Pi - 1$$

$$w_{K_\Pi + 2k} = v_k^{(1)} \text{ for } k = 0, \ldots, K_\Pi - 1$$

$$w_{K_\Pi + 2k+1} = v_k^{(2)} \text{ for } k = 0, \ldots, K_\Pi - 1$$

Denote the soft buffer size for the transport block by $N_{IR}$ bits and the soft buffer size for the $r$-th code block by $N_{cb}$ bits. The size $N_{cb}$ is obtained as follows, where $C$ is the number of code blocks computed in section 5.1.2:

- $N_{cb} = \min\left(\left\lfloor \dfrac{N_{IR}}{C} \right\rfloor, K_w\right)$ for downlink turbo coded transport channels

- $N_{cb} = K_w$ for uplink turbo coded transport channels where $N_{IR}$ is equal to:

Option #1

$$N_{IR,k} = \left\lfloor \frac{N_{soft}}{\left(\sum_{m=0}^{N_{carrier}-1} K_{MIMO,m} \cdot N_{RB,m}^{DL} \cdot \min(M_{DL\_HARQ,m}, M_{limit,m})\right) / N_{RB,k}^{DL}} \right\rfloor$$

Option #2

$$N_{IR,k} = \left\lfloor \frac{N_{soft}}{K_{MIMO,k}\left(\sum_{m=0}^{N_{carrier}-1} N_{RB,m}^{DL} \cdot \min(M_{DL\_HARQ,m}, M_{limit,m})\right) / N_{RB,k}^{DL}} \right\rfloor$$

where:

$N_{soft}$ is the total number of soft channel bits [4].

$K_{MIMO,k}$ is equal to 2 if the $k^{th}$ carrier of the UE is configured to receive PDSCH transmissions based on transmission modes 3, 4 or 8 as defined in section 7.1 of [3], 1 otherwise.

$N_{RB,k}^{DL}$ is the number of resource blocks in the bandwidth of the $k^{th}$ carrier.

$M_{DL\_HARQ,k}$ is the maximum number of DL HARQ processes for the $k^{th}$ carrier as defined in section 7 of [3].

$M_{limit,k}$ is a constant giving the maximum number of HARQ soft bit buffers for the $k^{th}$ carrier. The default value is a constant equal to 8.

$N_{carrier}$ is the total number of carriers for the UE.

/////////////////*Proposal #2 : Soft Bit Buffer Partitioning Based on Carrier-Dependent Weighting*/////////////////////////////////////

5.1.4.1.2 Bit collection, selection and transmission

The circular buffer of length $K_w = 3K_\Pi$ for the $r$-th coded block is generated as follows:

$w_k = v_k^{(0)}$ for $k = 0, \ldots, K_\Pi - 1$ $w_{K_\Pi + 2k} = v_k^{(1)}$ for $k = 0, \ldots, K_\Pi - 1$ $w_{K_\Pi + 2k + 1} = v_k^{(2)}$ for $k = 0, \ldots, K_\Pi - 1$ Denote the soft buffer size for the transport block by $N_{IR}$ bits and the soft buffer size for the $r$-th code block by $N_{cb}$ bits. The size $N_{cb}$ is obtained as follows, where $C$ is the number of code blocks computed in section 5.1.2:

- $N_{cb} = \min\left(\left\lfloor \dfrac{N_{IR}}{C} \right\rfloor, K_w\right)$ for downlink turbo coded transport channels

- $N_{cb} = K_w$ for uplink turbo coded transport channels where $N_{IR}$ is equal to:

Option #1

$$N_{IR,k} = \left\lfloor \dfrac{N_{soft}}{\left( \sum_{m=0}^{N_{carrier}-1} K_{MIMO,m} \cdot W_m \cdot \min(M_{DL\_HARQ,m}, M_{limit,m}) \right) \Big/ W_k} \right\rfloor$$

Option #2

$$N_{IR,k} = \left\lfloor \dfrac{N_{soft}}{K_{MIMO,k} \left( \sum_{m=0}^{N_{carrier}-1} \cdot W_m \cdot \min(M_{DL\_HARQ,m}, M_{limit,m}) \right) \Big/ W_k} \right\rfloor$$

where:

$N_{soft}$ is the total number of soft channel bits [4].

$K_{MIMO,k}$ is equal to 2 if the $k^{th}$ carrier of the UE is configured to receive PDSCH transmissions based on transmission modes 3, 4 or 8 as defined in section 7.1 of [3], 1 otherwise.

$W_k$ is the relative weighting factor for the $k^{th}$ carrier and is configured by higher layers.

$M_{DL\_HARQ,k}$ is the maximum number of DL HARQ processes for the $k^{th}$ carrier as defined in section 7 of [3].

$M_{limit,k}$ is a constant giving the maximum number of HARQ soft bit buffers for the $k^{th}$ carrier. The default value is a constant equal to 8.

$N_{carrier}$ is the total number of carriers for the UE.

////////////////Proposal #3 : HARQ Buffer Repartitioning Upon Carrier-Related Reconfiguration////////////////////////////////////

Proposal A:

*5.1.4.1.2 Bit collection, selection and transmission*

................omitted $N_{carrier}$ is the total number of configured carriers for the UE.

Proposal B $N_{carrier}$ is the total number of activated carriers for the UE.

Proposal C

5.1.4.1.2 Bit collection, selection and transmission

The circular buffer of length $K_w = 3K_\Pi$ for the $r$-th coded block is generated as follows:

$w_k = v_k^{(0)}$ for $k = 0, \ldots, K_\Pi - 1$ $w_{K_\Pi - 2k} = v_k^{(1)}$ for $k = 0, \ldots, K_\Pi - 1$ $w_{K_\Pi - 2k + 1} = v_k^{(2)}$ for $k = 0, \ldots, K_\Pi - 1$ Denote the soft buffer size for the transport block by $N_{IR}$ bits and the soft buffer size for the $r$-th code block by $N_{cb}$ bits. The size $N_{cb}$ is obtained as follows, where $C$ is the number of code blocks computed in section 5.1.2:

- $N_{cb} = \min\left(\left\lfloor \dfrac{N_{IR}}{C} \right\rfloor, K_w\right)$ for downlink turbo coded transport channels

- $N_{cb} = K_w$ for uplink turbo coded transport channels where $N_{IR}$ is equal to:

$$N_{IR,PCC} = \left\lfloor \dfrac{N_{soft,PCC}}{K_{MIMO} \cdot \min(M_{DL\_HARQ}, M_{limit})} \right\rfloor$$ for primary carrier $$N_{IR,k} = \left\lfloor \dfrac{N_{soft} - N_{soft,PCC}}{K_{MIMO,k} \left( \sum_{m=0}^{N_{carrier}-1} N_{RB,m}^{DL} \cdot \min(M_{DL\_HARQ,m}, M_{limit.m}) \right) \Big/ N_{RB,k}^{DL}} \right\rfloor$$ for secondary carriers.

where:

$N_{soft}$ is the total number of soft channel bits [4].

$N_{soft,sc}$ is the total number of soft channel bits for the primary component carrer and is configured by higher layers or defined in [4].

$K_{MIMO,k}$ is equal to 2 if the $k^{th}$ carrier of the UE is configured to receive PDSCH transmissions based on transmission modes 3, 4 or 8 as defined in section 7.1 of [3], 1 otherwise.

$N_{RB,k}^{DL}$ is the number of resource blocks in the bandwidth of the $k^{th}$ carrier.

$M_{DL\_HARQ,k}$ is the maximum number of DL HARQ processes for the $k^{th}$ carrier as defined in section 7 of [3].

$M_{limit,k}$ is a constant giving the maximum number of HARQ soft bit buffers for the $k^{th}$ carrier. The default value is a constant equal to 8.

$N_{carrier}$ is the total number of secondary configured (or activated) carriers for the UE.

*Proposal D:*

*–RRCConnectionReconfiguration*

The *RRCConnectionReconfiguration* message is the command to modify an RRC connection. It may convey information for measurement configuration, mobility control, radio resource configuration (including RBs, MAC main configuration and physical channel configuration) including any associated dedicated NAS information and security configuration.

Signalling radio bearer: SRB1

RLC-SAP: AM

Logical channel: DCCH

Direction: E-UTRAN to UE

RRCConnectionReconfiguration message

```
-- ASN1START

RRCConnectionReconfiguration ::=    SEQUENCE {
    rrc-TransactionIdentifier           RRC-TransactionIdentifier,
    criticalExtensions                  CHOICE {
        c1                                  CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE {}
    }
}

RRCConnectionReconfiguration-r8-IEs ::= SEQUENCE {
    measConfig                          MeasConfig                              OPTIONAL,    -- Need ON
    mobilityControlInfo                 MobilityControlInfo                     OPTIONAL,    -- Cond HO
    dedicatedInfoNASList                SEQUENCE (SIZE(1..maxDRB)) OF
                                            DedicatedInfoNAS                    OPTIONAL,    -- Cond
nonHO
    radioResourceConfigDedicated        RadioResourceConfigDedicated            OPTIONAL,    -- Cond HO-
toEUTRA
    securityConfigHO                    SecurityConfigHO                        OPTIONAL,    -- Cond HO
    nonCriticalExtension                RRCConnectionReconfiguration-v890-IEs   OPTIONAL
}

RRCConnectionReconfiguration-v890-IEs ::= SEQUENCE {
    lateR8NonCriticalExtension          OCTET STRING                            OPTIONAL,    -- Need OP
    nonCriticalExtension                RRCConnectionReconfiguration-v920-IEs   OPTIONAL
}

RRCConnectionReconfiguration-v920-IEs ::= SEQUENCE {
    otherConfig-r9                      OtherConfig-r9                          OPTIONAL,    -- Need ON
    fullConfig-r9                       ENUMERATED {true}                       OPTIONAL,    -- Cond
HO-Reestab
    nonCriticalExtension                RRCConnectionReconfiguration-v10xy-IEs  OPTIONAL
}

RRCConnectionReconfiguration-v10xy-IEs ::= SEQUENCE {
    pCellIndex-r10                      INTEGER (0),
    sCellToReleaseList-r10              SCellToReleaseList-r10    OPTIONAL,    -- Need ON
    sCellToAddModList-r10               SCellToAddModList-r10     OPTIONAL,    -- Need/ cond FFS
    SoftBufferPartitioningEnabled       BOOLEAN,
    ...
}

SCellToAddModList-r10 ::=       SEQUENCE (SIZE (1..maxSCell-r10)) OF SCellToAddMod-r10

SCellToAddMod-r10 ::=           SEQUENCE {
    sCellIndex-r10                      SCellIndex-r10,
    cellIdentification                  SEQUENCE {
        -- FFS what to specify here and what within the common information
        physCellId-r10                      PhysCellId,
        dl-CarrierFreq                      ARFCN-ValueEUTRA
    }                                                                           OPTIONAL, --
Need FF3
    radioResourceConfigCommon-r10       RadioResourceConfigCommonSCell-r10      OPTIONAL, --
Need FF3
    radioResourceConfigDedicated-r10    RadioResourceConfigDedicatedSCell-r10   OPTIONAL,    -- Need FFS
    ...
}

SCellToReleaseList-r10 ::=      SEQUENCE (SIZE (1..maxSCell-r10)) OF SCellIndex-r10

SecurityConfigHO ::=            SEQUENCE {
    handoverType                        CHOICE {
        intraLTE                            SEQUENCE {
```

```
            securityAlgorithmConfig           SecurityAlgorithmConfig    OPTIONAL,   --
Cond fullConfig
            keyChangeIndicator                BOOLEAN,
            nextHopChainingCount              NextHopChainingCount
        },
        interRAT                              SEQUENCE {
            securityAlgorithmConfig           SecurityAlgorithmConfig,
            nas-SecurityParamToEUTRA          OCTET STRING (SIZE(6))
        }
    },
    ...
}

-- ASN1STOP
```

| RRCConnectionReconfiguration field descriptions |
|---|
| *SoftBufferPartitioningEnabled*<br>If set to 'TRUE', UE shall repartition the soft bit buffer based on the number of configured Scells after reconfiguration. If set to 'FALSE', UE shall maintain the current soft bit buffer partitioning after reconfiguration. |

What is claimed is:

1. A method for handling hybrid automatic repeat request (HARQ) operations for aggregated carriers comprising:
   determining a total number of soft buffer bits of a soft buffer to be partitioned;
   obtaining a plurality of carrier-dependent weighting factors corresponding respectively to a plurality of aggregated carriers; and
   partitioning the soft buffer based at least in part on the carrier-dependent weighting factors to obtain a plurality of separate soft buffers for each of the plurality of aggregated carriers, the partitioning comprising selecting a soft buffer partition size based partly on at least one of:

$$N_{IR,k} = \left\lfloor \frac{N_{soft}}{\left[\left(\sum_{m=0}^{N_{carrier}-1} K_{MIMO,m} W_m \cdot \min(M_{DL_{HARQ},m}, M_{limit,m})\right)\middle/ W_k\right]} \right\rfloor,$$

$$N_{IR,k} = \left\lfloor \frac{N_{soft}}{\left[K_{MIMO,k}\left(\sum_{m=0}^{N_{carrier}-1} \cdot W_m \cdot \min(M_{DL_{HARQ},m}, M_{limit,m})\right)\middle/ W_k\right]} \right\rfloor,$$

$$N_{IR,k} = \left\lfloor \frac{N_{soft}}{\left[\left(\sum_{m=0}^{N_{carrier}-1} K_{MIMO,m} N_{RB,m}^{DL} \cdot \min(M_{DL_{HARQ},m}, M_{limit,m})\right)\middle/ N_{RB,k}^{DL}\right]} \right\rfloor, \text{ or}$$

$$N_{IR,k} = \left\lfloor \frac{N_{soft}}{\left[K_{MIMO,k}\left(\sum_{m=0}^{N_{carrier}-1} \cdot N_{RB,m}^{DL} \cdot \min(M_{DL_{HARQ},m}, M_{limit,m})\right)\middle/ N_{RB,k}^{DL}\right]} \right\rfloor,$$

Wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$N_{RB,m}^{DL}$ is a carrier bandwidth factor indicating the bandwidth of the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

2. The method of claim 1, where determining the total number of soft buffer bits comprises determining a user equipment category for a user equipment device selected to receive one or more transport blocks over the aggregated carriers.

3. The method of claim 1, where obtaining the plurality of carrier-dependent weighting factors comprises receiving dedicated control signaling that conveys the plurality of carrier-dependent weighting factors.

4. The method of claim 1, where obtaining the plurality of carrier-dependent weighting factors comprises receiving the plurality of carrier-dependent weighting factors in a cell-specific broadcast of the plurality of carrier-dependent weighting factors.

5. The method of claim 1, where obtaining the plurality of carrier-dependent weighting factors comprises deriving the plurality of carrier-dependent weighting factors from cell-specific broadcast information.

6. The method of claim 1 where partitioning the soft buffer comprises selecting a soft buffer partition size based on the following:

$$N_{IR,k} = \left\lfloor \frac{N_{soft}}{\left[\left(\sum_{m=0}^{N_{carrier}-1} K_{MIMO,m} \cdot W_m \cdot \min(M_{DL\_HARQ,m}, M_{limit,m})\right)\middle/ W_k\right]} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

7. The method of claim 1 where partitioning the soft buffer comprises selecting a soft buffer partition size based on the following:

$$N_{IR,k} = \left\lfloor \frac{N_{soft}}{\left[K_{MIMO,k}\left(\sum_{m=0}^{N_{carrier}-1} \cdot W_m \cdot \min(M_{DL\_HARQ,m}, M_{limit,m})\right)\middle/ W_k\right]} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

8. The method of claim 1 where partitioning the soft buffer comprises selecting a soft buffer partition size based on the following:

$$N_{IR,k} = \left\lfloor \frac{N_{soft}}{\left[\left(\sum_{m=0}^{N_{carrier}-1} K_{MIMO,m} \cdot N_{RB,m}^{DL} \cdot \min(M_{DL\_HARQ,m}, M_{limit,m})\right)\middle/ N_{RB,k}^{DL}\right]} \right\rfloor$$

wherein $N_{IR,k}$ is the soft buffer memory partition size for the $k^{th}$ carrier;

$N_{soft}$ is the total number of soft buffer bits for a specified UE category;

$N_{carrier}$ is the total number of aggregated carriers;

$N_{RB,m}^{DL}$ is a carrier bandwidth factor indicating the bandwidth of the $m^{th}$ carrier $K_{MIMO,m}$ is the maximum number of transport blocks for the $m^{th}$ carrier that are transmittable to a user equipment device in one transmission time interval;

$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

9. The method of claim 1 where partitioning the soft buffer comprises selecting a soft buffer partition size based on the following:

$$N_{IR,k} = \left\lfloor \frac{N_{soft}}{K_{MIMO,k}\left(\sum_{m=0}^{N_{carrier}-1} \cdot N_{RB,m}^{DL} \cdot \min(M_{DL\_HARQ,m}, M_{limit,m})\right) / N_{RB,k}^{DL}} \right\rfloor$$

wherein $N_{IR,k}$ is the soft buffer memory partition size for the $k^{th}$ carrier;

$N_{soft}$ is the total number of soft buffer bits for a specified UE category;

$N_{carrier}$ is the total number of aggregated carriers;

$N_{RB,m}^{DL}$ is a carrier bandwidth factor indicating the bandwidth of the $m^{th}$ carrier $K_{MIMO,m}$ is the maximum number of transport blocks for the $m^{th}$ carrier that are transmittable to a user equipment device in one transmission time interval;

$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

10. The method of claim 1, further comprising:

detecting a carrier-related reconfiguration for a subset of the aggregated carriers that does not include all of the aggregated carriers; and manipulating HARQ process information only in the one or more soft buffers corresponding to the subset of aggregated carriers without manipulating HARQ process information in the other soft buffer partitions.

11. The method of claim 1, where determining the total number of soft buffer bits to be partitioned comprises:

determining a total number of soft buffer bits to be used for the soft bit buffer;

assigning a predetermined number of the total number of soft buffer bits to a primary component carrier, leaving a remainder number of soft buffer bits;

detecting configuration information for a plurality of secondary component carriers; and assigning the remainder number of soft buffer bits as the total number of soft buffer bits to be partitioned among the plurality of secondary component carriers.

12. The method of claim 1, where obtaining the plurality of carrier-dependent weighting factors comprises obtaining a plurality of carrier-dependent weighting factors for a plurality of configured aggregated carriers.

13. The method of claim 1, where obtaining the plurality of carrier-dependent weighting factors comprises obtaining a plurality of carrier-dependent weighting factors for a plurality of activated aggregated carriers.

14. The method of claim 1, further comprising receiving dedicated control signaling indicating whether or not to repartition the total number of soft buffer bits in the event of reconfiguration of any one or more of the plurality of aggregated carriers.

15. A user equipment device configured to handle hybrid automatic repeat request (HARQ) operations for aggregated carriers, comprising:

a processor and a HARQ subsystem to determine a total number of soft buffer bits of a soft buffer to be partitioned for HARQ operations, and to partition the soft buffer among a plurality of aggregated carriers to obtain a plurality of soft buffer partitions having relative sizes, where the relative size of each soft buffer partition for each carrier in the plurality of aggregated carriers is computed as a function of a carrier-related property associated with the carrier, the processor and HARQ subsystem partition the total number of soft buffer bits by calculating a soft buffer partition size based partly on at least one of:

$$N_{IR,k} = \left\lfloor \frac{N_{soft}}{\left(\sum_{m=0}^{N_{carrier}-1} K_{MIMO,m} \cdot W_m \cdot \min(M_{DL\_HARQ,m}, M_{limit,m})\right) / W_k} \right\rfloor,$$

$$N_{IR,k} = \left\lfloor \frac{N_{soft}}{K_{MIMO,k}\left(\sum_{m=0}^{N_{carrier}-1} \cdot W_m \cdot \min(M_{DL\_HARQ,m}, M_{limit,m})\right) / W_k} \right\rfloor,$$

$$N_{IR,k} = \left\lfloor \frac{N_{soft}}{\left(\sum_{m=0}^{N_{carrier}-1} K_{MIMO,m} \cdot N_{RB,m}^{DL} \cdot \min(M_{DL\_HARQ,m}, M_{limit,m})\right) / N_{RB,k}^{DL}} \right\rfloor, \text{ or}$$

$$N_{IR,k} = \left\lfloor \frac{N_{soft}}{K_{MIMO,k}\left(\sum_{m=0}^{N_{carrier}-1} \cdot N_{RB,m}^{DL} \cdot \min(M_{DL\_HARQ,m}, M_{limit,m})\right) / N_{RB,k}^{DL}} \right\rfloor,$$

wherein $N_{IR,k}$ is the soft buffer memory partition size for the $k^{th}$ carrier;

$N_{soft}$ is the total number of soft buffer bits for a specified UE category;

$N_{carrier}$ is the total number of aggregated carriers;

$W_m$ is a relative carrier-dependent weighting factor for the $m^{th}$ carrier;

$N_{RB,m}^{DL}$ is a carrier bandwidth factor indicating the bandwidth of the $m^{th}$ carrier;

$K_{MIMO,m}$ is the maximum number of transport blocks for the $m^{th}$ carrier that are transmittable to a user equipment device in one transmission time interval;

$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

16. The user equipment device of claim 15, where the user equipment device obtains a plurality of carrier-related properties corresponding respectively to the plurality of aggregated carriers by receiving dedicated control signaling or broadcast control signaling that conveys the plurality of carrier-related properties or by receiving information that may be used to derive the plurality of carrier-related properties.

17. The user equipment device of claim 15, where the plurality of carrier-related properties comprises a plurality of carrier-dependent weighting factors associated with the plurality of aggregated carriers.

18. The user equipment device of claim 15, where the processor and HARQ subsystem determine the total number of soft buffer bits by determining a user equipment category for the user equipment device that is configured to receive one or more transport blocks over the aggregated carriers.

19. The user equipment device of claim 15, where the processor and HARQ subsystem partition the soft buffer by calculating a soft buffer partition size based on the following:

$$N_{IR,k} = \left\lfloor \frac{N_{soft}}{\left(\sum_{m=0}^{N_{carrier}-1} K_{MIMO,m} \cdot W_m \cdot \min(M_{DL\_HARQ,m}, M_{limit,m})\right) / W_k} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

20. The user equipment device of claim 15, where the processor and HARQ subsystem partition the soft buffer by calculating a soft buffer partition size based on the following:

$$N_{IR,k} = \left\lfloor \frac{N_{soft}}{K_{MIMO,k} \left(\sum_{m=0}^{N_{carrier}-1} \cdot W_m \cdot \min(M_{DL\_HARQ,m}, M_{limit,m})\right) / W_k} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

21. The user equipment device of claim 15, where the processor and HARQ subsystem partition the soft buffer by calculating a soft buffer partition size based on the following:

$$N_{IR,k} = \left\lfloor \frac{N_{soft}}{\left(\sum_{m=0}^{N_{carrier}-1} K_{MIMO,m} \cdot N_{RB,m}^{DL} \cdot \min(M_{DL\_HARQ,m}, M_{limit,m})\right) / N_{RB,k}^{DL}} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$N_{RB,m}^{DL}$ is a carrier bandwidth factor indicating the bandwidth of the $m^{th}$ carrier
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

22. The user equipment device of claim 15, where the processor and HARQ subsystem partition the soft buffer by calculating a soft buffer partition size based on the following:

$$N_{IR,k} = \left\lfloor \frac{N_{soft}}{K_{MIMO,k}\left(\sum_{m=0}^{N_{carrier}-1} \cdot N_{RB,m}^{DL} \cdot \min(M_{DL\_HARQ,m}, M_{limit,m})\right) / N_{RB,k}^{DL}} \right\rfloor$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$N_{RB,m}^{DL}$ is a carrier bandwidth factor indicating the bandwidth of the $m^{th}$ carrier
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and
$M_{limit,m}$ is the configured maximum number of hybrid automatic retransmit request processes for the $m^{th}$ carrier.

23. The user equipment device of claim 15, where the processor and HARQ subsystem detect a carrier-related reconfiguration for a subset of the aggregated carriers that does not include all of the aggregated carriers; and manipulate HARQ process information only in the one or more soft buffer partitions corresponding to the subset of aggregated carriers without manipulating HARQ process information in the other soft buffer partitions.

24. The user equipment device of claim 15, where the processor and HARQ subsystem determine the total number of soft buffer bits to be partitioned for HARQ operations by determining a total number of soft buffer bits to be used for the soft buffer; assigning a predetermined number of the total number of soft buffer bits to a primary component carrier, leaving a remainder number of soft buffer bits; detecting configuration information for a plurality of secondary component carriers; and assigning the remainder number of soft buffer bits as the total number of soft buffer bits to be partitioned among the plurality of secondary component carriers.

25. The user equipment device of claim 15, where the processor and HARQ subsystem obtain the plurality of carrier-related properties for a plurality of configured aggregated carriers.

26. The user equipment device of claim 15, where the processor and HARQ subsystem obtain the plurality of carrier-related properties for a plurality of activated aggregated carriers.

27. The user equipment device of claim 15, where the processor and HARQ subsystem receive dedicated control signaling indicating whether or not to repartition the total number of soft buffer bits in the event of reconfiguration of any one or more of the plurality of aggregated carriers.

28. A network element configured for handling hybrid automatic repeat request (HARQ) operations comprising a processor and a communications subsystem, where the network element is configured to:
  configure a user equipment device to receive data packets on a plurality of aggregated carriers;
  transmit data packets to the user equipment device on the plurality of aggregated carriers; and
  transmit a plurality of carrier-dependent weighting factors to the user equipment device which correspond respectively to the plurality of aggregated carriers, where the carrier-dependent weighting factors are transmitted for use by the user equipment device in partitioning a soft buffer based at least in part on the carrier-dependent weighting factors to obtain a plurality of soft buffers for the plurality of aggregated carriers which are sized based on relative carrier-dependent weighting factors,
  where the soft buffers are sized based partly on at least one of:

$$N_{IR,k} = \left\lfloor \frac{N_{soft}}{\left(\sum_{m=0}^{N_{carrier}-1} K_{MIMO,m} \cdot W_m \cdot \min(M_{DL\_HARQ,m}, M_{limit,m})\right)/W_k} \right\rfloor,$$

$$N_{IR,k} = \left\lfloor \frac{N_{soft}}{K_{MIMO,k}\left(\sum_{m=0}^{N_{carrier}-1} \cdot W_m \cdot \min(M_{DL\_HARQ,m}, M_{limit,m})\right)/W_k} \right\rfloor,$$

$$N_{IR,k} = \left\lfloor \frac{N_{soft}}{\left(\sum_{m=0}^{N_{carrier}-1} K_{MIMO,m} \cdot N_{RB,m}^{DL} \cdot \min(M_{DL\_HARQ,m}, M_{limit,m})\right)/N_{RB,k}^{DL}} \right\rfloor, \text{ or}$$

$$N_{IR,k} = \left\lfloor \frac{N_{soft}}{K_{MIMO,k}\left(\sum_{m=0}^{N_{carrier}-1} \cdot N_{RB,m}^{DL} \cdot \min(M_{DL\_HARQ,m}, M_{limit,m})\right)/N_{RB,k}^{DL}} \right\rfloor,$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$N_{RB,m}^{DL}$ is a carrier bandwidth factor indicating the bandwidth of the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

29. The network element of claim 28, wherein the network element is an evolved node B.

30. The network element of claim 28, where the network element transmits the plurality of carrier-dependent weighting factors by transmitting dedicated control signaling that conveys the plurality of carrier-dependent weighting factors.

31. The network element of claim 28, where the network element transmits the plurality of carrier-dependent weighting factors by broadcasting the plurality of carrier-dependent weighting factors in a cell.

32. A computer program embodied on a non-transitory computer-readable medium, the computer program configured to control a processor to perform a method for handling hybrid automatic repeat request (HARQ) operations for aggregated carriers, comprising:
  determining a total number of soft buffer bits of a soft buffer to be partitioned for HARQ operations;
  obtaining a plurality of carrier-related properties corresponding respectively to a plurality of aggregated carriers; and
  partitioning the soft buffer among the plurality of aggregated carriers based at least in part on the plurality of carrier-related properties associated with the plurality of aggregated carriers to obtain a plurality of soft buffers having relative sizes based on the plurality of carrier-related properties,
  where partitioning the soft buffer comprises selecting a soft buffer partition size for a kth carrier from the plurality of aggregated carriers,
  where selecting the soft buffer partition size comprises calculating a soft buffer partition size based partly on at least one of:

$$N_{IR,k} = \left\lfloor \frac{N_{soft}}{\left(\sum_{m=0}^{N_{carrier}-1} K_{MIMO,m} \cdot W_m \cdot \min(M_{DL\_HARQ,m}, M_{limit,m})\right)/W_k} \right\rfloor,$$

$$N_{IR,k} = \left\lfloor \frac{N_{soft}}{K_{MIMO,k}\left(\sum_{m=0}^{N_{carrier}-1} \cdot W_m \cdot \min(M_{DL\_HARQ,m}, M_{limit,m})\right)/W_k} \right\rfloor,$$

$$N_{IR,k} = \left\lfloor \frac{N_{soft}}{\left(\sum_{m=0}^{N_{carrier}-1} K_{MIMO,m} \cdot N_{RB,m}^{DL} \cdot \min(M_{DL\_HARQ,m}, M_{limit,m})\right)/N_{RB,k}^{DL}} \right\rfloor, \text{ or}$$

$$N_{IR,k} = \left\lfloor \frac{N_{soft}}{K_{MIMO,k}\left(\sum_{m=0}^{N_{carrier}-1} \cdot N_{RB,m}^{DL} \cdot \min(M_{DL\_HARQ,m}, M_{limit,m})\right)/N_{RB,k}^{DL}} \right\rfloor,$$

wherein $N_{IR,k}$ is the soft buffer memory partition size for the $k^{th}$ carrier;
$N_{soft}$ is the total number of soft buffer bits for a specified UE category;
$N_{carrier}$ is the total number of aggregated carriers;
$W_m$ is a relative carrier-dependent weighting factor for the $m^{th}$ carrier;
$N_{RB,m}^{DL}$ is a carrier bandwidth factor indicating the bandwidth of the $m^{th}$ carrier;
$K_{MIMO,m}$ is the maximum number of transport blocks for the $m^{th}$ carrier that are transmittable to a user equipment device in one transmission time interval;
$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

33. The computer program of claim 32, where obtaining the plurality of carrier-related properties comprises receiving dedicated control signaling or broadcast control signaling that conveys the plurality of carrier-related properties or receiving information that may be used to derive the plurality of carrier-related properties.

34. The computer program of claim 32, where obtaining the plurality of carrier-related properties comprises deriving bandwidth information for each of the aggregated carriers.

35. The computer program of claim 32, where partitioning the total number of soft buffer bits comprises selecting a soft buffer partition size for a kth carrier from the plurality of aggregated carriers by dividing a weighting factor for the kth carrier by a sum of all weighting factors for the aggregated carriers.

36. The computer program of claim 35, where selecting the soft buffer partition size comprises calculating a soft buffer partition size based on the following:

$$N_{IR,k} = \left\lfloor \frac{N_{soft}}{\left( \sum_{m=0}^{N_{carrier}-1} K_{MIMO,m} \cdot W_m \cdot \min(M_{DL\_HARQ,m}, M_{limit,m}) \right) / W_k} \right\rfloor$$

wherein $N_{IR,k}$ is the soft buffer memory partition size for the $k^{th}$ carrier;

$N_{soft}$ is the total number of soft buffer bits for a specified UE category;

$N_{carrier}$ is the total number of aggregated carriers;

$W_m$ is a relative carrier-dependent weighting factor for the $m^{th}$ carrier;

$K_{MIMO,m}$ is the maximum number of transport blocks for the $m^{th}$ carrier that are transmittable to a user equipment device in one transmission time interval;

$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

37. The computer program of claim 35, where selecting the soft buffer partition size comprises calculating a soft buffer partition size based on the following:

$$N_{IR,k} = \left\lfloor \frac{N_{soft}}{K_{MIMO,mk} \left( \sum_{m=0}^{N_{carrier}-1} \cdot W_m \cdot \min(M_{DL\_HARQ,m}, M_{limit,m}) \right) / W_k} \right\rfloor$$

wherein $N_{IR,k}$ is the soft buffer memory partition size for the $k^{th}$ carrier;

$N_{soft}$ is the total number of soft buffer bits for a specified UE category;

$N_{carrier}$ is the total number of aggregated carriers;

$W_m$ is a relative carrier-dependent weighting factor for the $m^{th}$ carrier;

$K_{MIMO,m}$ is the maximum number of transport blocks for the $m^{th}$ carrier that are transmittable to a user equipment device in one transmission time interval;

$M_{DL\_HARQ,m}$ is the maximum number of downlink hybrid automatic retransmit request processes for the $m^{th}$ carrier; and $M_{limit,m}$ is the configured maximum number of hybrid automatic retransmit request processes for the $m^{th}$ carrier.

* * * * *

UNITED STATES PATENT AND TRADEMARK OFFICE
CERTIFICATE OF CORRECTION

PATENT NO. : 9,480,048 B2
APPLICATION NO. : 13/823778
DATED : October 25, 2016
INVENTOR(S) : Andrew Mark Earnshaw et al.

Page 1 of 1

It is certified that error appears in the above-identified patent and that said Letters Patent is hereby corrected as shown below:

In the claims

In column 45, line 41, delete "$N_{RB,m}{}^{DL}$" and insert -- $N_{RB,m}^{DL}$ --

In column 47, line 4, delete "$N_{RB,m}{}^{DL}$" and insert -- $N_{RB,m}^{DL}$ --

In column 47, line 30, delete "$N_{RB,m}{}^{DL}$" and insert -- $N_{RB,m}^{DL}$ --

In column 48, line 47, delete "$N_{RB,m}{}^{DL}$" and insert -- $N_{RB,m}^{DL}$ --

In column 50, line 12, delete "$N_{RB,m}{}^{DL}$" and insert -- $N_{RB,m}^{DL}$ --

In column 50, line 40, delete "$N_{RB,m}{}^{DL}$" and insert -- $N_{RB,m}^{DL}$ --

In column 51, line 60, delete "$N_{RB,m}{}^{DL}$" and insert -- $N_{RB,m}^{DL}$ --

In column 52, line 60, delete "$N_{RB,m}{}^{DL}$" and insert -- $N_{RB,m}^{DL}$ --

Signed and Sealed this
Twentieth Day of December, 2016

Michelle K. Lee
*Director of the United States Patent and Trademark Office*